(12) United States Patent
Fu

(10) Patent No.: US 6,611,119 B2
(45) Date of Patent: Aug. 26, 2003

(54) SWITCHING PROCESSES FOR CONTROL OF SERVOS

(75) Inventor: Jyun-Horng Fu, Manassas, VA (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/943,326

(22) Filed: Aug. 30, 2001

(65) Prior Publication Data

US 2003/0076063 A1 Apr. 24, 2003

(51) Int. Cl.$^7$ ............................................... G05B 11/01
(52) U.S. Cl. .................... 318/560; 318/568.1; 318/569; 318/632; 318/635; 360/61; 369/44.29; 369/44.35; 369/44.36
(58) Field of Search ............................... 318/560, 568.1, 318/569, 611, 623, 632, 635; 360/61; 369/44.25, 44.27, 44.29, 44.34, 44.35, 44.36

(56) References Cited

U.S. PATENT DOCUMENTS

| | | | |
|---|---|---|---|
| 3,770,984 A | * 11/1973 | Connor et al. ............... | 307/237 |
| 3,794,931 A | * 2/1974 | Albrecht et al. .............. | 330/29 |
| 3,819,999 A | * 6/1974 | Platt .......................... | 318/609 |
| 4,551,664 A | * 11/1985 | Wong et al. ................. | 318/592 |
| 4,647,826 A | * 3/1987 | Ota ............................ | 318/561 |
| 4,716,353 A | * 12/1987 | Engelmann .................. | 320/21 |
| 5,202,871 A | * 4/1993 | Yokota ..................... | 369/44.29 |
| 5,565,812 A | * 10/1996 | Soenen ........................ | 327/558 |
| 5,642,244 A | * 6/1997 | Okada et al. ................ | 360/61 |
| 5,781,362 A | * 7/1998 | Bang ........................ | 360/78.05 |
| 6,138,048 A | * 10/2000 | Hayner ........................ | 700/31 |

OTHER PUBLICATIONS

Anthans, "Minimum–Fuel Control of Second–Order Systems with Real Poles," *Minimum Fuel Control of Second–Order Systems*, 148–153 (May 1964)/.

Barbieri et al., "A New Minimum–Time Control Law For a One–Mode Model of a Flexible Slewing Structure," *IEEE Transactions on Automatic Control*, 38(1), 142–146 (Jan. 1993).

Davies, "Analytical Design For Time Optimum Transient Response of Hydraulilc Servomechanisms," *Journal of Mechanical Engineering Science*, 7(1), 8–14 (1965).

Davison et al., "A Computational Technique for Finding 'Bang–Bang' Controls of Non–Linear Time–Varying Systems," *Automatic*, 7, 225–260 (1971).

Ellert et al., "Synthesis of Feedback Controls Using Optimization Theory–An Example," *IEEE Transactions on Automatic Control*, 89–103 (Apr. 1963).

Farlow, "A Note on Switching Times for Time–Optimal Control Systems," *IEEE Transactions on Automatic Control*, 118–119 (Feb. . . .).

Farlow, "On Finding Switching Times in Time Optimal Control Systems," *Int. J. Control*, 17(4), 855–861 (1973).

Foy, "Fuel Minimization in Flight Vehicle Attitude Control," *IEEE Transactions on Automatic Control*, 84–88 (date unknown).

Hill et al., "Minimum Overshoot Design for SISO Discrete–Time Systems," *IEEE Transactions on Automatic Control*, 38(1), 155–158 (Jan. 1993).

(List continued on next page.)

*Primary Examiner*—Bentsu Ro
*Assistant Examiner*—Rina I. Duda
(74) *Attorney, Agent, or Firm*—Ryan, Laura A. Fogg and Associates, LLC

(57) ABSTRACT

Methods and systems for controlling a servo are provided. One method includes calculating at least a first switching time to change an amplitude of a command signal to a servo, providing a first amplitude to the servo for the first switching time, and switching the amplitude of the command signal to the servo from the first amplitude to a second amplitude at the first switching time. The second amplitude is the command signal amplitude.

49 Claims, 20 Drawing Sheets

OTHER PUBLICATIONS

Neustadt, "Time Optimal Control Systems With Position and Integral Limits," *Journal of Mathematical Analysis and Applications, 3*, 406–427 (1961).

Pao, "Minimum–Time Control Characteristics of Flexible Structures," *Journal of Guidance, Control, and Dynamics, 19*(1), 123–129 (Jan.–Feb. 1996).

Pao et al., "On the Equivalence of Minimum Time Input Shaping with Traditional Time–Optimal Control," *Proceedings of the 4th IEEE Conference on Control Applications*, Albany, NY, 1120–1225 (Sep. 1995).

Singer et al.m "Preshaping Command Inputs to Reduce System Vibration," *Transactions of ASME, 112*, 76–82 (Mar. 1990).

Singh et al., "Planar, Time–Optimal, Rest–to–Rest Slewing Maneuvers of Flexible Spacecraft," *J. Guidance, 12*(1), 71–81 (Jan.–Feb. 1989).

Smith, "Feedback Control Systems," McGraw–Hill, New York (1958).

Wang, "Analytical Design of Electrohydraulic Servomechanismis with Near Time–Optimal Responses," *IEEE Transactions on Automatic Control*, 15–27 (Jan. 1963).

Yastreboff, "Synthesis of Time–Optimal Control By Time Interval Adjustment", *IEEE Transactions on Automatic Control*, 707–710 (Dec. 1969).

* cited by examiner

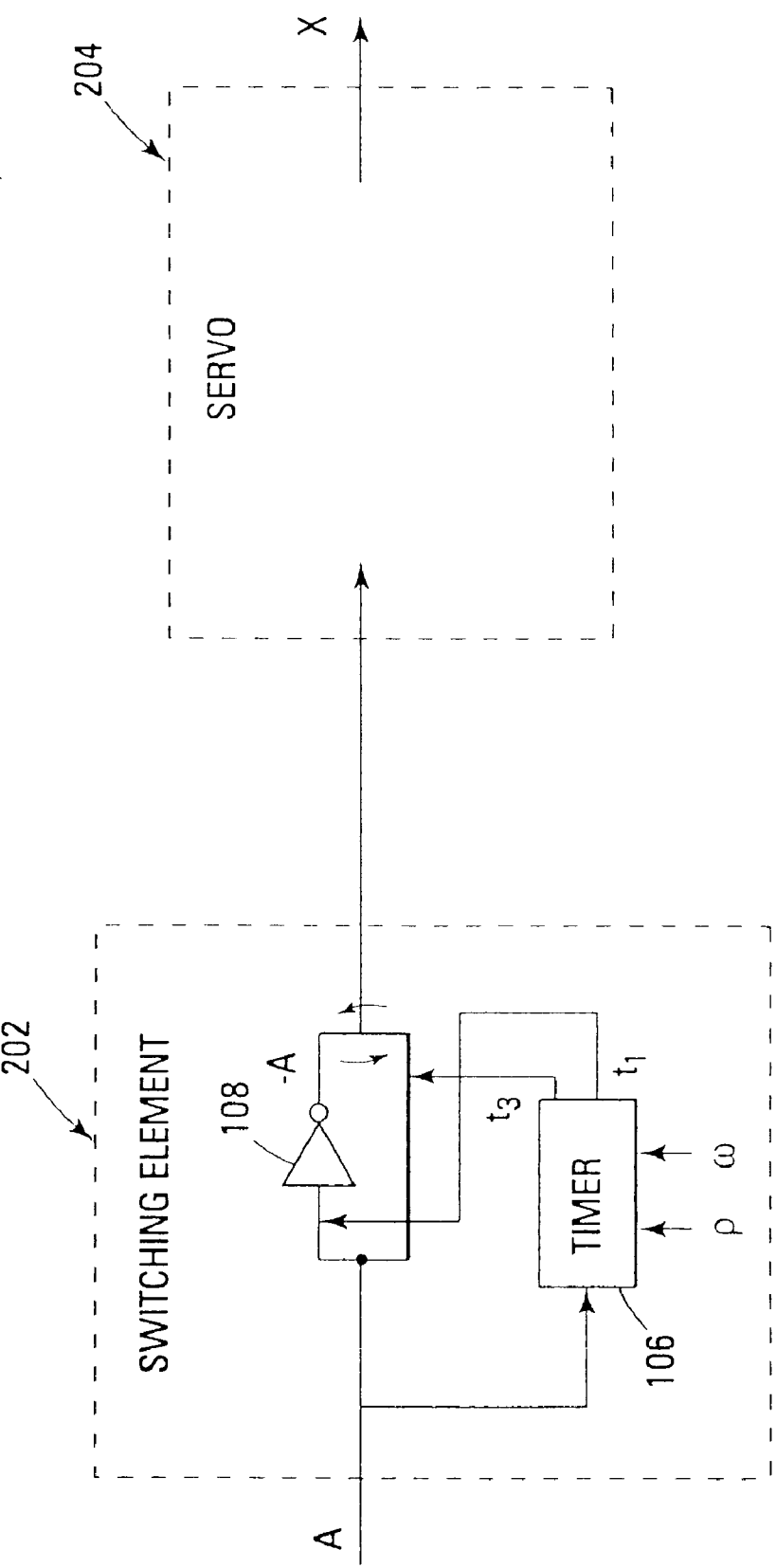

η-parametric curves of $\phi_1, \phi_2, \phi_3$ vs. $p$.

Fig. 10  Simulation and Comparison of the Three Switching Processes.

Trajectories of the "MA Switching Processed" and the "Natural" Servos; $p > 1$, $\mu = 0.5$.

Trajectories of the "MA Switching Processed" and the "Natural" Servos; $p = 1$, $\mu = 0.5$.

Trajectories of the "MA Switching Processed" and the "Natural" Servos; $p = -1.1$, $\mu = 0.5$.

MA Switching Processed Smart Servo in Continuous Operation; p = 0.1, maximum amplitude = 10.

Robustness of the Switching Process Illustrated by 5% and 10% off the Right Schedule.

SWITCHING PROCESSES FOR CONTROL OF SERVOS

The present invention relates generally to servo control, and more specifically to switching processes for sensor-free servo control.

BACKGROUND

The concept of feedback control has witnessed countless advances and breakthroughs, one after another, not only in theory but in diverse applications far beyond its original engineering horizon. Its richness also has necessitated the creation of new disciplines and finer division of old disciplines, such as adaptive control, optimal control, $H_\infty$-control, and the like. Amongst the list of challenges and accomplishments from its inception, servomechanisms are one of the most fundamental problems in control theory.

In the simplest setting, a servo can be cast into a standard linear, second order, constant-coefficient ordinary differential equation most often used in modeling a mass-damper-spring system with an external excitation, also referred to in certain cases as an input or a stimulus.

Servomechanisms, or servos, are typically controlled using feedback. However, the use of feedback implies use of sensors to measure observables. Sensors have an associated cost. Sensors take up space which could otherwise be used for payload, and sensors have an associated weight that must be considered for overall performance, specifications, guidance, range, and the like. Further, sensors themselves bring uncertainty and noise into systems. Sensors placed on the servo, or incorporated into the servo, gather and relay information, typically including position, velocity, and acceleration information, to a controller through feedback paths. Such feedback leads to good control of servo operation.

Consider a standard mass-damper-spring system that is severely underdamped. Such systems suffer not only large over- and under-shoots but long settling times. The former poses danger in saturation and excites nonlinear dynamics either unconsidered or ignored, whereas the latter can induce catastrophic resonance among all such systems.

Overdamped and the critically damped systems have zero overshoot but suffer long rising time and so have even longer settling time. A related feature of these systems is their monotony. The 'steady' state is reached only asymptotically.

There are a collection of feedback control problems which historically have been solved in this manner: (a) solving the open-loop control as a function of time $U=u(t)$, (b) equating u as an unknown function, or operator F (linear, nonlinear) of the state x, the output y, or the measurement z, and solving for F.

Preliminary Considerations and Previous Results

Consider a basic servomechanism problem to begin with. For single input single output (SISO) linear time invariant (LTI) systems in form of $$a_n x^{(n)} + a_{n-1} x^{(n-1)} + \ldots + a_1 \dot{x} + a_0 x = u(t), \quad (2.1)$$

with a given desired system response x(t) satisfying certain essential Laplace transformability conditions, the pertinent servo control input $\hat{u}(t)$ can be shown as given by $$\hat{u} = L^{-1}\{R_n \hat{X} - R_{n-1} x_0 - R_{n-2} \dot{x}_0 - \ldots - R_1 x_0^{(n-2)} - R_0 x_0^{(n-1)}\} \quad (2.2)$$

where $\hat{X}(s) = L\{\hat{x}(t)\}$, $\hat{x}(t)$ the desired system response, and $$R_k(s) := a_n s^k + a_{n-1} s^{k-1} + \ldots + a_{n-k-1} s + a_{n-k} = s R_{n-1} + a_{n-k}, R_0 = a_n. \quad (2.3)$$

In particular, if $x_0 = \dot{x}_0 = \ldots \dot{x}_0^{(n-1)} = 0$, then $$\hat{u} = L^{-1}\{(a_n s^n + \ldots + a_1 s + a_0) \hat{X}\}. \quad (2.4)$$

For multiple input multiple output (MIMO) LTI systems $\dot{x} = Ax + Bu$, equation (2.2) changes to $$\hat{u} = (B^T B)^{-1} B^T [(sI - A) \hat{X} - x_0] \quad (2.5)$$

assuming invertibility of $B^T B$. Equations (2.2)–(2.3) are considered as a summary/solution to the most basic linear servomechanism problems. No consideration is given to conditions such as $\|u(t)\| \leq 1$, however.

Note that if $\hat{x}(t) = \hat{x}_f$ for $t \geq t_f$, then $$\hat{X}(s) = \int_0^{t_f} \hat{x} e^{-st} dt = -\frac{e^{-s t_f}}{s}\left[\hat{x}_f + \int_0^{t_f} \dot{\hat{x}} e^{-st} dt\right] = \quad (2.6)$$

$$\ldots = -\frac{e^{-s t_f}}{s}\left[\hat{x}_f + \frac{1}{s}\dot{\hat{x}}_f + \frac{1}{s^2}\ddot{\hat{x}}_f + \ldots\right],$$

provided that (2.1) starts from rest. On the other hand, given an input $\hat{u}(t) \leftrightharpoons \hat{U}(s)$, $$\hat{X} = \frac{U + \sum_{k=1}^{n} R_{n-k} x_0^{(k-1)}}{R_n} =: \frac{N(s)}{P(s)}. \quad (2.7)$$

Smith (Smith, O. J. M., *Feedback Control Systems*, McGraw-Hill, N.Y., 1958) was the first who proposed Posi-cast control (for positive-cast) and demonstrated the idea with a very simple mechanism, a pendulum. For time-optimal control systems, Neustadt (Neustadt, L. W., "Time Optimal Control Systems With Position and Integrals Limits," *J. Math. Anal. and Appl.*, Vol. 3, 406–427, 1961) included position and integral limits in the Pontryagin Maximum Principle. Wang (Wang, P. K. C., "Analytical Design of Electrohydraulic Servomechanisms with Near Time-Optimal Responses," *IEEE Trans. Auto. Control*, Vol. 8, No. 1, 15–27, 1963) had a dual-mode closed-loop analytical design for electrohydraulic servomechanisms. Davies (Davies, R. M., "Analytical Design for Time Optimum Transient Response of Hydraulic Servomechanisms," *J. Mech. Eng. Sci.*, Vol. 7, No. 1, 8–14, 1965) had an analytical design for hydraulic servomechanism. Being oriented toward practical application, both Wang and Davies elaborated on modeling and operation of nonlinear electrohydraulic and hydraulic servomechanisms, respectively. Athens (Athens, M., "Minimum-Fuel Control of Second-Order Systems with Real Poles," *IEEE Trans. Auto. Control*, Vol. 9, No. 5, 148–153, 1964) derived the switching curves for minimum-fuel control of linear second-order systems with real poles. Different from minimum-time problem in which the control is necessarily bang-bang, the minimum-fuel control results in a bang-zero-bang profile. Of related interest, Ellert and Merriam (Ellert, F. J., and Merriam, C. W., "Synthesis of Feedback Controls Using Optimization Theory—An Example," *IEEE Trans. Auto. Control*, Vol. 8, No. 4, 89–103, 1963) employed the so-called Parametric Expansion Method to vary the weighting factors for synthesis of linear time-varying feedback controls using optimization theory and illustrated by designing an aircraft landing system.

Yastreboff (Yastreboff, M., "Synthesis of Time-Optimal Control by Time Interval Adjustment," *IEEE Trans. Auto. Control*, Vol. 14, No. 12, 707–710, 1969) seemed to have initiated synthesis of time-optimal control for LTI systems with real modes by time interval adjustment. It has appeared that Goldwyn-Sriram-Graham (Goldwyn, R. M., Sriram, K. P., and Graham, M., *J. SIAM Control*, Vol. 5, 295, 1967) was the first which explicitly considered the switching times as unknowns to solve. Davison and Monro (Davison, E. J., and Monro, D. M., "A Computational Technique for Finding "Bang-Bang" Controls of Non-Linear Time-Varying Systems," *Automatica*, Vol. 7, 255–260, 1971) gave a hill climbing-based computational technique finding the bang-bang control switching times of nonlinear time-varying systems. Farlow (Farlow, F. J., "On Finding Switching Times in optimal Control Systems," *Int. J. Control*, Vol. 17, No. 4, 855–861, 1973) extended Goldwyn-Sriram-Graham and used complex analysis to form and solve the switching times for LTI control systems with real poles. Consider now a unit-ON/OFF input $$\hat{u} = 1 - 2u(t-t_1) + 2u(t-t_2) - \ldots + \quad (2.8)$$

$$2(-1)^{n_s-1}u(t-t_{n_s-1}) + (-1)^{n_s}u(t-t_{n_s}) \leftrightarrow \hat{U} =$$

$$\frac{1}{s}[1 - e^{-st_1} + 2e^{-st_2} - \ldots + 2(-1)^{n_s-1}e^{-st_{n_s-1}} + (-1)^{n_s}e^{-st_{n_s}}]$$

where $t_1, \ldots, t_{n_s} =: t_f$ are the unknowns. Farlow reasoned that they can be solved thru equations $$\lim_{s \to s_k} N(s) = 0$$

where $$P(s_k)=0, k=1, \ldots, n, \quad (2.9)$$

by applying a property of removable singularities for complex entire functions. Farlow restriced this method to real $s_k$ only. In addition, it does not appear that (2.9) is solvable (with $0<t_1< \ldots <t_f$) for any given initial condition. Recent attention of minimum-time and/or of minimum-fuel control has been centered at flexible structures. Singh, Kabamba, and McClamroch pointed out an important time-symmetry property in planar, time-optimal, rest-to-rest stewing maneuvers of flexible spacecraft (Singh, G., Kabamba, P. T., and McClamroch, N. H., "Planar, Time-Optimal, Rest-to-Rest Slewing Maneuvers of Flexible Spacecraft," *AIAA J. Guidance*, Vol. 12, No. 1, 71–81, 1989). Focused on reducing or eliminating the endpoint vibration, Singer and Seering took an input-shaping approach making use of multiple impulses and convolution and showed its robustness to parameter variations (Singer, N. C., and Seering, W. P., "Preshaping Command Inputs to Reduce System Vibration," *Trans ASME*, Vol. 112, 76–82, March, 1990). More recently, Pao led extensive studies in this area showing the equivalence between minimum-time input shaping and traditional time-optimal control [Pao-Singhose 1995], comparing constant and variable amplitude input shaping methods for vibration reduction [Pao-Singhose 1995], and obtaining minimum-time control characteristics of flexible structures (Pao, L. Y., "Minimum-Time Control Characteristics of Flexible Structures," *AIAA J. Guidance, Control, and Dynamics*, Vol. 19, No. 1, 123–129, 1996). Earlier, Barbieri and Özgüner also proposed a new minimum-time control law for a one-mode model of a flexible slewing structure (Barbieri, E., and Özgüner, Ü., "A New Minimum-Time Control Law for a One-Mode Model of a Flexible Slewing Structure," *IEEE Trans. Auto. Control*, Vol. 38, No. 1, 12–146, 1993).

The control systems in the papers mentioned above are all in the form of $$\dot{x}=Ax+bu \quad (2.10)$$

where $$A=[A_0 \times A_1 \times \ldots \times A_n] \text{ and } b=[0;b_0;0;b_1;\ldots;0;b_n], \quad (2.11)$$

with $$A_0 = \begin{pmatrix} 0 & 1 \\ 0 & 0 \end{pmatrix}, b_0 = 1, A_i = \begin{pmatrix} 0 & 1 \\ -\omega_i^2 & -2\xi_i\omega_i \end{pmatrix},$$

i=1, ..., n (x and; denoting (block) diagonal and column formations, respectively). That is, n oscillatory modes are modeled in, or rather added into, consideration in addition to the main, double-integrator. There, the pivotal equation $$\begin{cases} 1 - 2e^{\omega_i s_i t_1} + \ldots + 2(-1)^{n_s}e^{\omega_i s_i t_{n_s}} + (-1)^{n_s+1}e^{\omega_i s_i t_f} = 0, \\ 1 - 2e^{\omega_i \bar{s}_i t_1} + \ldots + 2(-1)^{n_s}e^{\omega_i \bar{s}_i t_{n_s}} + (-1)^{n_s+1}e^{\omega_i \bar{s}_i t_f} = 0, \end{cases} \quad (2.12)$$

$$i = 1, \ldots, n,$$

with k the number of switches, $$s_i := p_i + \sqrt{p_i^2 - 1},$$

$0<t_1< \ldots <t_{n_s}$ the switching times and $t_f:=t_{n_s+1}$, were stated without derivation.

In addition, all the mentioned literature considered the control problem as a stabilization, viz. return to zero problem. In spite of their mathematical equivalence, a servo perspective is different from a stabilization viewpoint.

Damped Phase, Error Window, and Damped Settling Time

A standard underdamped second order linear control system is modeled as follows:

$$x''+2p\omega x'+\omega^2 x=\omega^2 A, \, x(0)=x_0, \, x'(0)=y_0, \quad (3.1)$$

where $p<1$ and $\omega>0$. Let $A>0$ without loss of generality. The solution x and its time-derivatives x' and x", also commonly interpreted as position, velocity, and acceleration, are given by $$x = A - e^{-r\phi}\left\{(A-x_0)\cos\phi - \left[\frac{y_0}{qw} - r(A-x_0)\right]\sin\phi\right\}, \quad (3.2)$$

$$x' = e^{-r\phi}\{y_0\cos\phi + (ry_0 + d\omega(A-x_0))\sin\phi\} =: y. \quad (3.3)$$

The following quantities are defined:

$$[q, r, d, \phi, \tau] := \left[\sqrt{1-p^2}, \frac{p}{q}, \frac{1}{q}, q\omega t, \frac{\pi}{q\omega}\right] \quad (3.4)$$

associated with the identities:

$$p^2 + q^2 = 1, \; p = qr = \frac{r}{\sqrt{1+r^2}}, \; q = \frac{1}{d}, \qquad (3.5)$$
$$d = \sqrt{1+r^2}, \; q^2(1+r^2) = 1.$$

Note also that $$0 < \alpha := \cos^{-1} p = \sin^{-1} q = \tan^{-1} \frac{q}{p} = \cot^{-1} r < \frac{\pi}{2}. \qquad (3.6)$$

Traditionally, consideration of p is centered about 1, i.e., classifying (3.1) into being underdamped with p<1, pardamped (critically damped) with p=1 and overdamped with p>1. From a qualitative (stability) viewpoint, p=0, viz. r=0 is the criticality: x(t) crosses A infinitely many times; p→1, viz. r→∞ is the limit (that x(t) crosses A infinitely many times); and p>1 renders the number of these crossings to only zero or possibly only one or two (but never more).

It will be clear that working with the damped phase (angle) $\phi$ is more than with time t directly. In addition, $\alpha$ is monotone, decreasing in p, viz. the more severely underdamped (3.1) is, the closer $\alpha$ is to its maximum $\pi/2$. Another significance of p involves maximum velocity; see Remark 4.1.

It is common that (3.1) is considered as a servomechanism by which in minimum time possible, (3.1) settles in a specified error window about the command value A. To specify such a window and this minimum time, also known as the settling time, denote the absolute and relative errors by E=E(t):=|A−x| and $\epsilon$=$\epsilon$(t):=E(t)/|A|. The error window may be specified either by the absolute excursion $\overline{E}$ or by the relative excursion $\overline{\epsilon}$, that E≦$\overline{E}$ or $\epsilon$≦$\overline{\epsilon}$ for all $\overline{t}$≦t (and the settling time is the minimum of such $\overline{t}$). For instance, x is the commanded angle of attack $\alpha$, $\overline{E}$ might be 0.1°$\pi$/180, while $\overline{\epsilon}$ might be, say, 5% of the commanded angle of attack.

The notion of precision $$\overline{v} := \frac{1}{\overline{\epsilon}} = \frac{\overline{E}}{|A|} \qquad (3.7)$$

then follows naturally. This notion leads further to the power of precision $$\sigma := ln\overline{v}, \qquad (3.8)$$

an equivalent of the binary, index of difficulty I:=$\log_2 \overline{v}$, also identified as bits of information. Note that I=$\sigma \log_2 e$= 1.442695$\sigma$.

With all system-intrinsic parameters considered, the settling time of (3.1), denoted by $t_s$, is a function of $\overline{s}$, or any of its equivalents, $\overline{\epsilon}$, $\sigma$, etc. Besides, it is self-evident that $t_s$ also depends on the initial condition $[x_0, \dot{y}_0]$ of (3.1). To determine the settling time of (3.1) given an initial condition $[x_0, y_0]$, process flows from the simplest state, also known as the zero state, with $[x_0, y_0]$=[0, 0] to the most general cases.

With $[x_0, y_0]$=[0, 0], [x, y] reduces to $$[x,y]=A[1-e^{-r\phi}(\cos\phi+r\sin\phi), d\omega e^{-r\phi}\sin\phi]. \qquad (3.9)$$

Evidently, when y=0, x has its turning (maximum or minimum) points, at which $\overline{\phi}_k$=k$\pi$ and $$\overline{x}_k = A[1+(-1)^{k+1}\lambda^{rk}], \; k=1,2,\ldots. \qquad (3.10)$$

where $$\lambda := e^{-\pi}.$$

It is easy, then, to see that the overshoots and the undershoots occur at k=1,3,5,7, . . . and k=2,4,6,8, . . . , respectively, with excursion magnitudes A$\lambda^{kr}$.

By (3.10), Ae$^{-kr\pi}$≦$\overline{E}$ and e$^{-kr\pi}$≦$\overline{\epsilon}$ for $[x_0, y_0]$=[0, 0]. It follows that $$\overline{\phi} = \pi\left\lceil\frac{\sigma}{r\pi}\right\rceil \Leftrightarrow \overline{t} = \frac{\pi}{q\omega}\left\lceil\frac{\ln(1/\overline{\epsilon})}{r\pi}\right\rceil = \tau\left\lceil\frac{\sigma}{r\pi}\right\rceil \geq \tau > \frac{\pi}{\omega}, \qquad (3.11)$$

where $\lceil(\cdot)\rceil$ is the smallest integer greater than $(\cdot)$. The term $\lceil\sigma/r\pi\rceil$ gives the total count of excursions (peaks and valleys) about A when 'settled.'

If $x_0 \neq 0$ and $y_0=0$, (3.2)–(3.3) become $$[x,y]=A[1-\epsilon_0 e^{-r\phi}(\cos\phi r\sin\phi), d\omega\epsilon_0 e^{-r\phi}\sin\phi] \qquad (3.12)$$

($\epsilon_0$=(A−$x_0$)/A by definition). Therefore, $\epsilon_0$ if $x_0$>A, in which case the excursion sequence reverses that for $\epsilon$>0. It is easy to see that $\overline{\phi}_k$=k$\pi$ still while $\overline{x}_k$ becomes $$\overline{X}_k = A[1+(-1)^{k+1}\epsilon_0\lambda^{rk}], \; k=1,2,\ldots. \qquad (3.13)$$

It follows that $$\overline{t} = \frac{\pi}{q\omega}\left\lceil\frac{\ln\left(\frac{|\epsilon_0|}{\overline{\epsilon}}\right)}{r\pi}\right\rceil = \frac{\pi}{q\omega}\left\lceil\frac{\sigma+\ln|\epsilon_0|}{r\pi}\right\rceil. \qquad (3.14)$$

The excursions in this case are |A−$x_0$| $\lambda^{rk}$. Note that $\overline{t}$=0 if |$\epsilon_0$|≦$\overline{\epsilon}$; (3.14) still applies.

For $x_0$=0 and $y_0 \neq 0$, (3.2)–(3.3) reduce to $$[x,y]=A[\{1e^{-r\Phi}(\cos\Phi+(r-d\eta)\sin\Phi), d\omega e^{-r\Phi}(b\cos\Phi+a\sin\Phi)\}] \qquad (3.15)$$

where $$[\eta, a, b, c, \cos\beta, \sin\beta] := \left[\frac{y_0}{\omega A}, 1-p\eta, q\eta, \sqrt{a^2+b^2}, -\frac{a}{c}, \frac{b}{c}\right]. \qquad (3.16)$$

Note that b≠0 and $$1-2p\eta+\theta^2 = 1-2p\eta+p^2\eta^2+q^2\eta^2 = a^2+b^2 = c^2. \qquad (3.17)$$

Thus, the excursions occur at the positive solutions of $$a\sin\phi + b\cos\phi = 0 \Leftrightarrow b\cos\phi = -a\sin\phi. \qquad (3.18)$$

For $\overline{x}_1$>A (the first overshoot), however, it requires that $$\cos\overline{\phi}_1 + \left(r-\frac{\eta}{q}\right)\sin\overline{\phi}_1 < 0 \Rightarrow -\frac{1-2p\eta+\eta^2}{\eta}\sin\overline{\phi}_1 = \qquad (3.19)$$
$$-\frac{c^2 b}{q}\sin\overline{\phi}_1 < 0 \Rightarrow b\sin\overline{\phi}_1 > 0.$$

It follows that $$\begin{cases} \cos\overline{\phi}_1 = -\dfrac{a}{c}, \\ \sin\overline{\phi}_1 = +\dfrac{b}{c}. \end{cases} \qquad (3.20)$$

Solving for (3.20) requires some care due to the number of sign combinations of (a,b) possible.

The minimum solutions $\hat{v} > 0$ and $v > 0$, respectively, of the systems of trigonometric equations $$[\cos\theta, \sin\theta] = \left[-\dfrac{d}{\sqrt{d^2+n^2}}, +\dfrac{n}{\sqrt{d^2+n^2}}\right] \text{ and}$$

$$[\cos\theta, \sin\theta] = \left[+\dfrac{d}{\sqrt{d^2+n^2}}, -\dfrac{n}{\sqrt{d^2+n^2}}\right],$$

are given by $$\hat{v} := \begin{cases} v, & \text{if } (d,n) = (-,+), \\ \pi - v, & \text{if } (d,n) = (+,+), \\ \pi - v, & \text{if } (d,n) = (+,-), \\ 2\pi + v, & \text{if } (d,n) = (-,-). \end{cases} \qquad (3.21)$$

and $$\diamondsuit := \begin{cases} \pi + v, & \text{if } (d,n) = (-,+), \\ 2\pi - v, & \text{if } (d,n) = (+,+), \\ -v, & \text{if } (d,n) = (+,-), \\ \pi + v, & \text{if } (d,n) = (-,-). \end{cases}$$

where $$v := \sin^{-1}\dfrac{n}{\sqrt{n^2+d^2}}. \qquad (3.22)$$

By Lemma 3.1 and with similar reasoning for undershoot, $$\cos\overline{\phi}_k = (-1)^{k-1}\left(-\dfrac{a}{c}\right), \qquad (3.23)$$

$$\sin\overline{\phi}_k = (-1)^{k-1}\dfrac{b}{c} \Rightarrow \overline{\phi}_k = \hat{\beta} + (k-1)\pi,$$

$$k = 1, 2, 3, \ldots\;.$$

Note that as $y_0 \to 0$, $a \to 1$ and $b \to 0$, so $\beta \to 0$ while $\hat{\beta} \to \pi$. Thus, $$\overline{x}_k = A[1 + (-1)^{k-1}ce^{-r\hat{\beta}}\lambda^{rk-r}], \; k=1,2,3,\ldots \qquad (3.24)$$

with excursion magnitudes $Ace^{-r\hat{\beta}}\lambda^{rk-r}$, which lead to $$\bar{t} = \qquad (3.25)$$

$$\dfrac{1}{q\omega}\left\{\left(\hat{\beta} + \pi \cdot \left\lceil\dfrac{\ln(1/\bar{\epsilon}) + \ln c - r\hat{\beta}}{r\pi}\right\rceil\right)\right\} = \dfrac{1}{q\omega}\left\{\hat{\beta} + \pi \cdot \left\lceil\dfrac{\sigma + \ln c - r\hat{\beta}}{r\pi}\right\rceil\right\}.$$

Note that a and b cannot be both negative. Another important phase angle $\hat{\beta}$ also has emerged. Inevitably, however, the multiple sign combinations of (a,b) render analysis and computation for the x turning points complicated.

As an example, the case $\hat{\beta} = \pi - \beta$ can be obtained as follows. For a>0 and b<0, $\eta<0$. So $x(t)$ actually decreases before it turns toward A; that is, the first x-turning point, which occurs at $\phi = \beta$, has $|A-x| > A$ and is not pertinent to settling time consideration. The next 'chance' of x-turning takes place $\pi$ later.

For $x_0 \neq 0$ and $y_0 \neq 0$, (3.2)–(3.3) become $$[x,y] = A[1 - e^{-r\phi}(\epsilon_0 \cos\phi + (r\epsilon_0 - d\eta)\sin\phi), d\omega e^{-r\phi}(b\cos\phi + 'a \sin\phi)] \qquad (3.26)$$

where a and c are adapted to $$[a', c', \cos\beta', \sin\beta'] := \left[a - \dfrac{x_0}{A}, \sqrt{a'^2 + b^2}, -\dfrac{a'}{c'}, \dfrac{b}{c'}\right]. \qquad (3.27)$$

The x-turning point occurs at $\overline{\phi}_k = \hat{\beta}' + (k-1)\pi$ and $$\overline{x}_k = A[1 + (-1)^{k-1}c'e^{-r(\hat{\beta}' + (k-1)\pi)}], \; k=1,2,3,\ldots, \qquad (3.28)$$

with excursion magnitudes $Ac'e^{-r\hat{\beta}'}\lambda^{rk-r}$, and it follows that $$\bar{t} = \dfrac{\pi}{q\omega}\left(\hat{\beta}' + \left\lceil\dfrac{\ln\left(\dfrac{1}{\bar{\epsilon}}\right) + \ln c' - r\hat{\beta}'}{r\pi}\right\rceil\right) = \tau\left(\hat{\beta}' + \left\lceil\dfrac{\sigma + \ln c' - r\hat{\beta}'}{r\pi}\right\rceil\right). \qquad (3.29)$$

Note that the additional complexity with $\epsilon_0 \neq 1$ has allowed (a',b) be (−,−).

Theorem 3.1. Consider the settling time of (3.1). Then: $\bar{t} \geq \tau > \pi/\omega$ for any $[x_0, y_0]$ and (a) if $x_0 = 0$ and $y_0 = 0$, the excursions are $\lambda^{rk}|A|$ and $\bar{t}$ is given by (3.11).

(b) if $x_0 \neq 0$ but $y_0 = 0$, the excursions are $\lambda^{rk}|A - x_0|$ and $\bar{t}$ is given by (3.15).

(c) if $x_0 = 0$ but $y_0 \neq 0$, the excursions are $\lambda^{rk-r}|A|ce^{-r\hat{\beta}}$ and $\bar{t}$ is given by (3.25).

(d) if $x_0 \neq 0$ and $y_0 \neq 0$, $\lambda^{rk-r}|A|c'e^{-r\hat{\beta}'}$ and $\bar{t}$ is given by (3.29).

As an example, say $p = \sqrt{3}/2$ (slightly underdamped), hence $q = \frac{1}{2}$, $t_s$ will be at least the full natural period. Long settling time is inevitable if (3.1) is not 'attended,' that is, if some certain admissible measure, such as switching, is not applied. Above, $\bar{\epsilon} = e^{-3} \cong 5\%$ (hence, $\sigma = 3$ and I=4.322), p=0.1 (hence, q=0.9950 and r=0.1005) and $\omega = 1$ whenever numerical comparison is called for. Thus, $t_s = 31.5742$, and it would take up to 30 ups-and-downs to settle in.

Therefore, there is a need in the art for methods and apparatuses for reducing settling time in servos, without using costly and space consuming sensors.

SUMMARY

In one embodiment, a method for controlling a servo includes calculating at least a first switching time to change an amplitude of a command signal to a servo, providing a first amplitude to the servo for the first switching time, and switching the amplitude of the command signal to the servo from the first amplitude to a second amplitude at the first switching time.

In another embodiment, a servo system includes a servo, a processor operatively connected to control the servo, and a timer programmed to switch an input command signal amplitude at predetermined switching times.

In yet another embodiment, a command program for switching a servo without sensors includes machine readable instructions for effecting a method which includes calculating at least a first switching time to switch a command amplitude from a first level to a second level, and switching the amplitude of the command signal to the servo at the switching time.

In still another embodiment, a method of switching a servo includes applying predetermined input values to the servo at predetermined times, and settling the servo using only the input values and switching times.

Other embodiments are described and claimed.

BRIEF DESCRIPTION OF THE DRAWINGS

FIG. 2 is a block diagram of another embodiment of a servo system;

DETAILED DESCRIPTION

Figure 1:
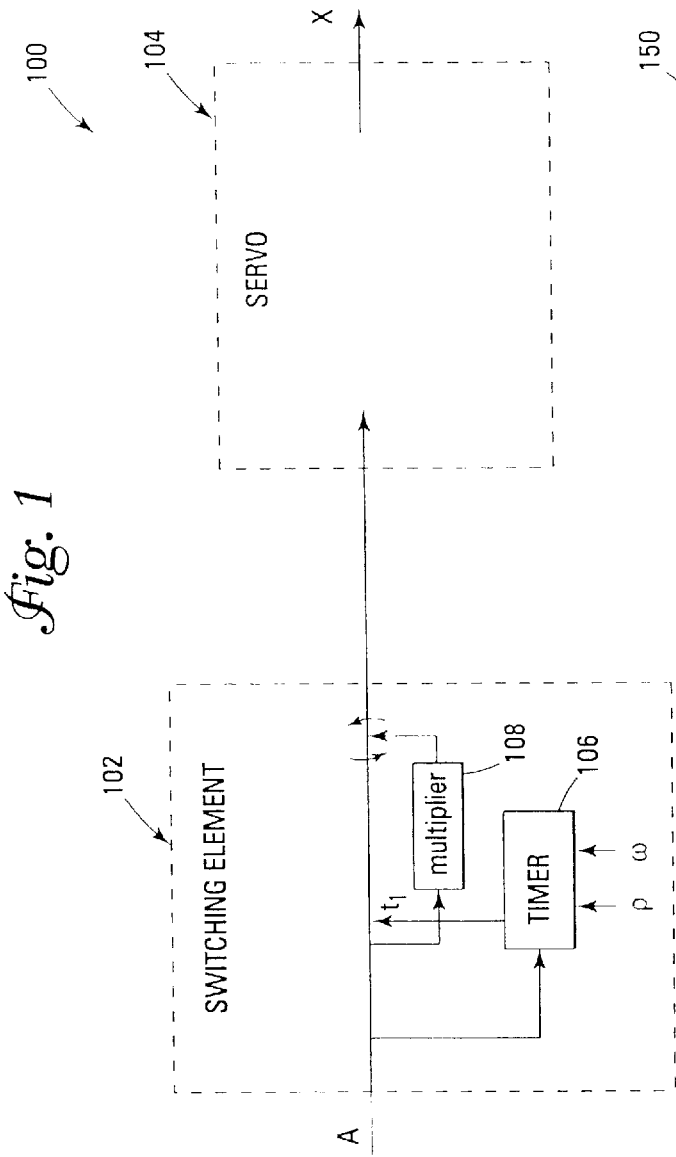
FIG. 1 is a block diagram of an embodiment of a servo system.

In the following detailed description of the embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention.

GENERAL CONSIDERATIONS

The various embodiments of the present invention described in greater detail below illustrate servomechanisms without the need of any sensors, to achieve some desired qualities, such as rapid settling and negligible overshoot. At certain right prescribed timing, certain right input values are applied for servo control. The input values and the switching schedule are obtained via mathematical analysis. At the first opportunity of a finite time, servos employing the various embodiments reach a commanded input value at zero velocity. Being the first opportunity gives the desired quality of rapid settling. Reaching the commanded input value at zero velocity yields null overshoot.

For all open-loop control systems whose state solutions can be given explicitly as functions of time, the need of sensors for certain control objectives is eliminated or alleviated by use of timers such as in the embodiments described in further detail below. The collection of solvable systems includes, but is not limited to, all finite dimensional time-invariant linear systems and a class of autonomous nonlinear systems. Because everything within the 'system' is known to the time t, any sensor-based control action u=u(x(t),t) can instead be given in terms of a time-based function u=v(t). As an example, consider a linear time invariant (LTI) system. Finding the VSS-switching surfaces yields, in the present embodiments, precisely when a switching surface is reached, and the issue of position serves as an algebraic equation in unknown t>0.

In general terms, the embodiments of the present invention describe switching processes which reduce the settling time t* of a servo, given $\overline{E}$ or $\overline{\epsilon}$; t* meets the condition t*<$t_s$. The command level input amplitude in the embodiments is generally referred to as A. It should be understood that A is simply an abbreviation, and that A is not identical for each embodiment. In fact, A can and does vary widely depending upon any number of factors.

The various embodiments of the present invention operate without the use of sensors. In order to operate without sensors, the switching processes take no measure of position x or velocity x' during operation. That is, the switching processes are open-loop switching processes. The various embodiments determine the various switching times $t_1$, $t_2$, and so on in terms of variables p, ω, and $y_0$, where p is the damping ratio, and ω is the frequency. The most simple case considered in this application is with $[x_0, y_0] = [0,0]$, i.e., $$x'' + 2p\omega x' + \omega^2 x = \omega^2 A, \quad [x, x'] = [0, 0], \quad (4.1)$$

Other more complicated conditions such as non-zero initial velocity, unstable systems, and the like are considered in various alternative embodiments. From this point on, the overbar ¯ will be dropped from the notation of the 'settled' phase/time unless otherwise stated.

Necessity of Switching

From equations (3.2)–(3.3):

$$[x, y] = \left[ A - (A - x_0)e^{-r\phi}(\cos\phi + \sin\phi), \frac{\omega}{q}(A - x_0)e^{-r\phi}\sin\phi \right] \quad (4.2)$$

-continued if $y_0 = 0$, $$[x, y] = \left[A + \frac{y_0}{q\omega}e^{-r\phi}\sin\phi, y_0 e^{-r\phi}(\cos\phi - r\sin\phi)\right],$$

if $x_0 = A$, $[x, y] = [A, 0]$ if $[x_0, y_0] = [A, 0]$.

The first two cases exhibit overshoots and undershoots before settling at A. The last case is the 'ideal' for a servomechanism. There are no remnant ripples, reducing potential mechanical fatigues and inhibiting any 'gallops' due to unmodeled resonant modes.

While unlikely, it does suggest that if the condition $[x_0,y_0]=[A,0]$ is fulfilled 'at some point' (other than t=0), (3.1) is truly settled from that point on. An issue is whether $[x(t),y(t)]=[A,0]$ will automatically happen to (3.1) on its own at some t>0. The answer is no.

Theorem 4.1. (Necessity of Switching) If $[x_0,y_0]\neq[A,0]$, then $[x(t),y(t)]\neq[A,0]$ for any t>0, i.e., (3.1) can never arrive at [A,0] autonomously.

Proof. To solve for t such that $[x(t),y(t)]=[A,0]$ is tantamount to solving $\phi>0$ such that the coefficients of the term $e^{-r\phi}$ in (3.2)–(3.3) equal zero simultaneously. This is equivalent to a system of 2×2 homogeneous linear equations in two unknowns, cos $\phi$ and sin $\phi$, who coefficient matrix has a nonzero determinant $-q[\omega^2(x_0-A)^2+2p\omega(x_0-A)y_0+y_0^2]$. It follows that [cos $\phi$, sin $\phi$]=[0,0], which is impossible.

Remark 4.1. Mathematically, the option that, for instance, of applying −A first and switches back to +A at $t_1$ cannot be ruled out just so naively. Indeed, suppose there is a $t_2$ (after switching back to +A) such that $X(t_3)=A$ and $y(t_3)=0$, then $x(t)=A$ for all $t>t_3$. Logically, +A may also be applied directly, attempting to find $t_1$ with $[x_1,y_1]=[A,0]$, and void the switching altogether.

Shrunk-Fit Switching

Figure 10:
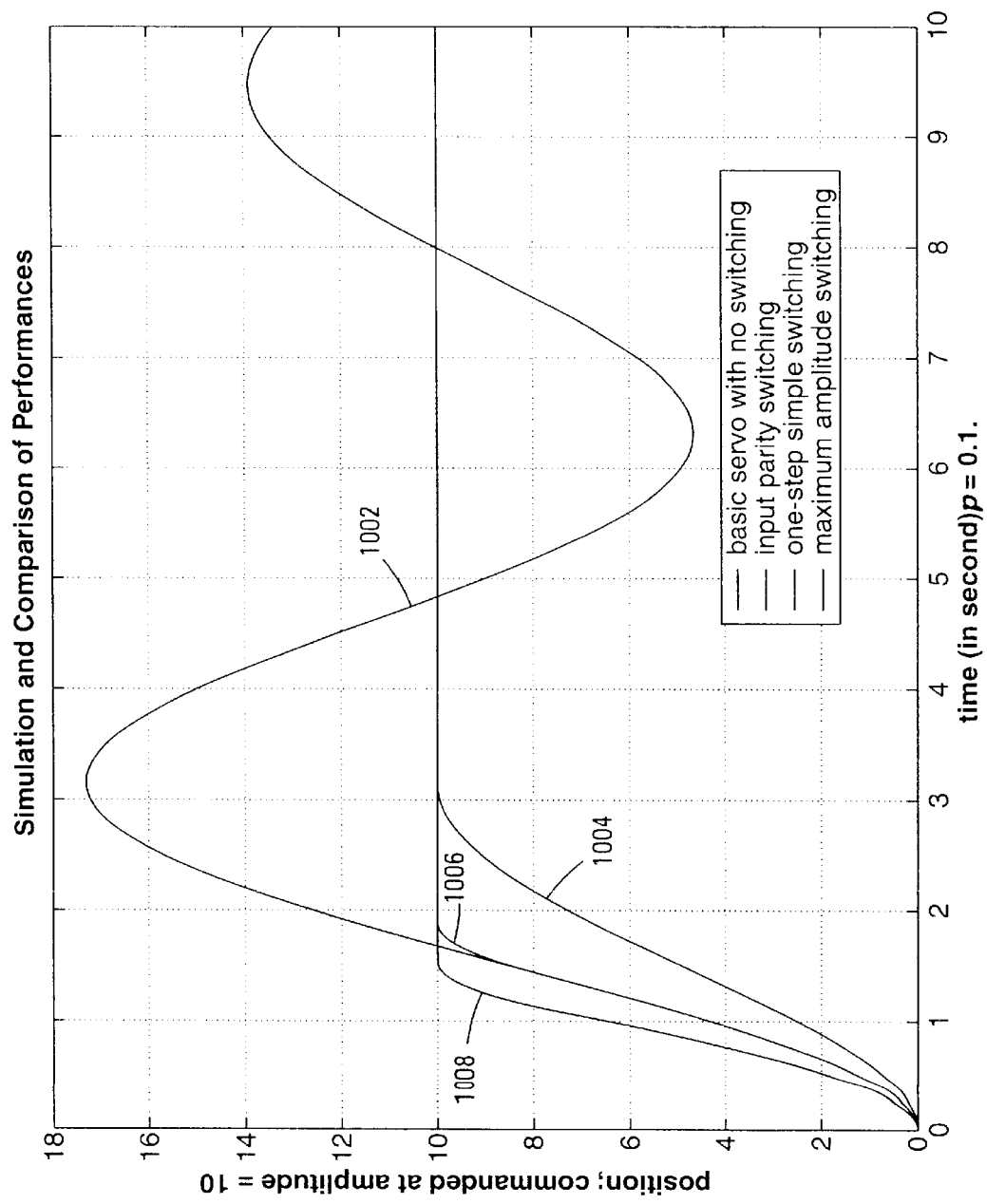
FIG. 10 is a graph of position comparisons for servos according to various embodiments of the present invention.

FIG. 1 is a block diagram of an embodiment 100 of a server system employing shrunk fit switching as described in greater detail above. Servo system 100 comprises a switching element 102 and a servo 104. Switching element 102 accepts an input-amplitude A, and outputs an amplitude to the servo 104 to which it is connected. Switching element 102 includes a timer 106 and a multiplier 108. Multiplier 108 is in one embodiment pre-programmed with a constant multiplier k to which the input amplitude is applied. The modified input amplitude kA is presented to the servo 104 for a first time period $t_1$ from time 0 to time $t_1$. After time $t_1$, the amplitude A is presented to the servo 104. FIG. 10 shows an expected settling time for a servo system of this embodiment compared with other servo settling embodiments described herein. From FIG. 10, it is seen that improvement over unswitched servo systems is dramatic.

The switching time $t_1$ and the constant multiplier k are determined below using the equations outlined above. This embodiment of non-sensor switching comprises switching commands once during an operation. One switching process that involves exactly one intermediate command: Apply to (4.1) with $A_1=kA$ from time t=0 to time $t_1$ and switch back to A from then on.

For (4.1) applied with the shrunk-fit switching process, not only the settling time is reduced by a factor of $$\lceil \frac{\sigma}{r\pi} \rceil,$$

but the excursion is completely annihilated.

The derivation is almost immediate: From (3.9), setting $y_1=0$ and $x_1=A$ results in $$[\phi_1, A_1] = \left[\pi, \frac{A}{1+e^{-r\pi}}\right]. \quad (4.3)$$

The fact that the denominator of the $A_1$ equation is greater than 1 means that the amplitude of the intermediate command 'shrinks' from A to $A_1$<A giving the name 'shrunk-fit.' This process has the advantage of being simple, but the resulting settling time is still τ. If the servomechanism is subject to frequent change of constant input commands, or its nominal mode of continuous operation expects so, and in particular, if the new command arrives before the (reduced) settling time finishes its lapse, the performance of this switching process may remain inadequate. Further reduction of settling time (while retaining zero excursion) motivates other switching processes with increased complexity.

The shrunk-fit switching process applies to simple harmonic motion, i.e., (4.1) with p=0. Note that in this case, $A_1=A/2$. Note that the settling time resulting from this and other switching processes to be described further below is independent of the size of the error window and independent of the servo command A. This part of reduction is, however, only minor (if not minimal) compared to the overall reduction. The present discussion does not elaborate on reduction of $\bar{t}$ contributed from the error window for this and other switching processes.

Indeed, the exact settling time resulting from the shrunk-fit switching process is given by the solution $\bar{\phi}$ of the equation $$e^{-r\bar{\phi}}(\cos\bar{\phi}+r\sin\bar{\phi})=\epsilon(1+e^{-r\pi})-e^{-r\pi} \quad (4.4)$$

derived by retrofitting: $A_1[1-e^{-r\bar{\phi}}(\cos\phi+r\sin\phi)]=(1\ 1-\epsilon)A$. $\bar{\phi}$ is a function of $\epsilon$ for which no closed-form is accessible. Observe through $\bar{\phi}\to\pi$ as $\epsilon\to 0$.

Figure 1A:
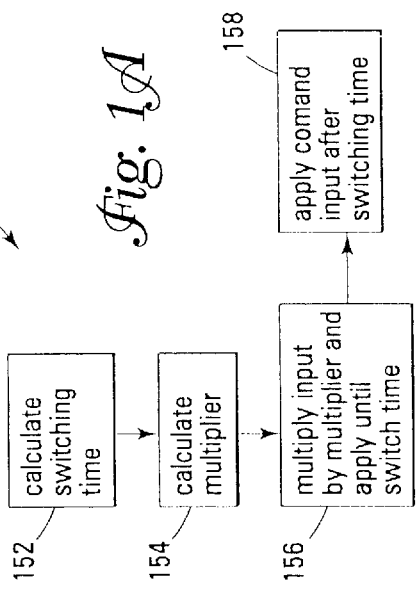
FIG. 1A is a flow chart diagram of a process according to one embodiment of the present invention.

An embodiment of a shrunk fit switching process 150 is shown in FIG. 1A. Process 150 comprises in this embodiment calculating a first switching time in block 152, calculating a multiplier constant in block 154, applying a command input amplitude multiplied by the multiplier constant for a time period from 0 to the switching time in block 156, and applying the command input amplitude after the switching time in block 158. It should be understood that the multiplier constant can be computed for the servo and hard programmed so that it does not need calculation every time. Alternatively, in another embodiment, a series of multipliers are stored in a lookup table determined by the servo.

Input-Parity Switching

FIG. 2 is a block diagram of an embodiment 200 of a servo system employing input parity switching as described in greater detail above. Servo system 200 comprises a switching element 202 and a servo 204. Switching element 202 accepts an input amplitude A, and outputs an amplitude to the servo 204. Switching element 202 includes a timer 206 and an inverter 208. The switching process of switching element 202 has the timer 206 pre-programmed to provide the amplitude A to the servo 204 for a first time $t_1$ from time 0 to time $t_1$, to provide an inverted amplitude −A to the servo 204 for a period $t_2$ from first time $t_1$ to second time $t_3$, where $t_1+t_2=t_3$, and to provide amplitude A to servo 204 from time $t_3$ forward. FIG. 10 shows an expected settling time for a servo system of this embodiment compared with other servo settling embodiments described herein. From FIG. 10, it is seen that improvement over unswitched servo systems is dramatic.

Figure 2B:
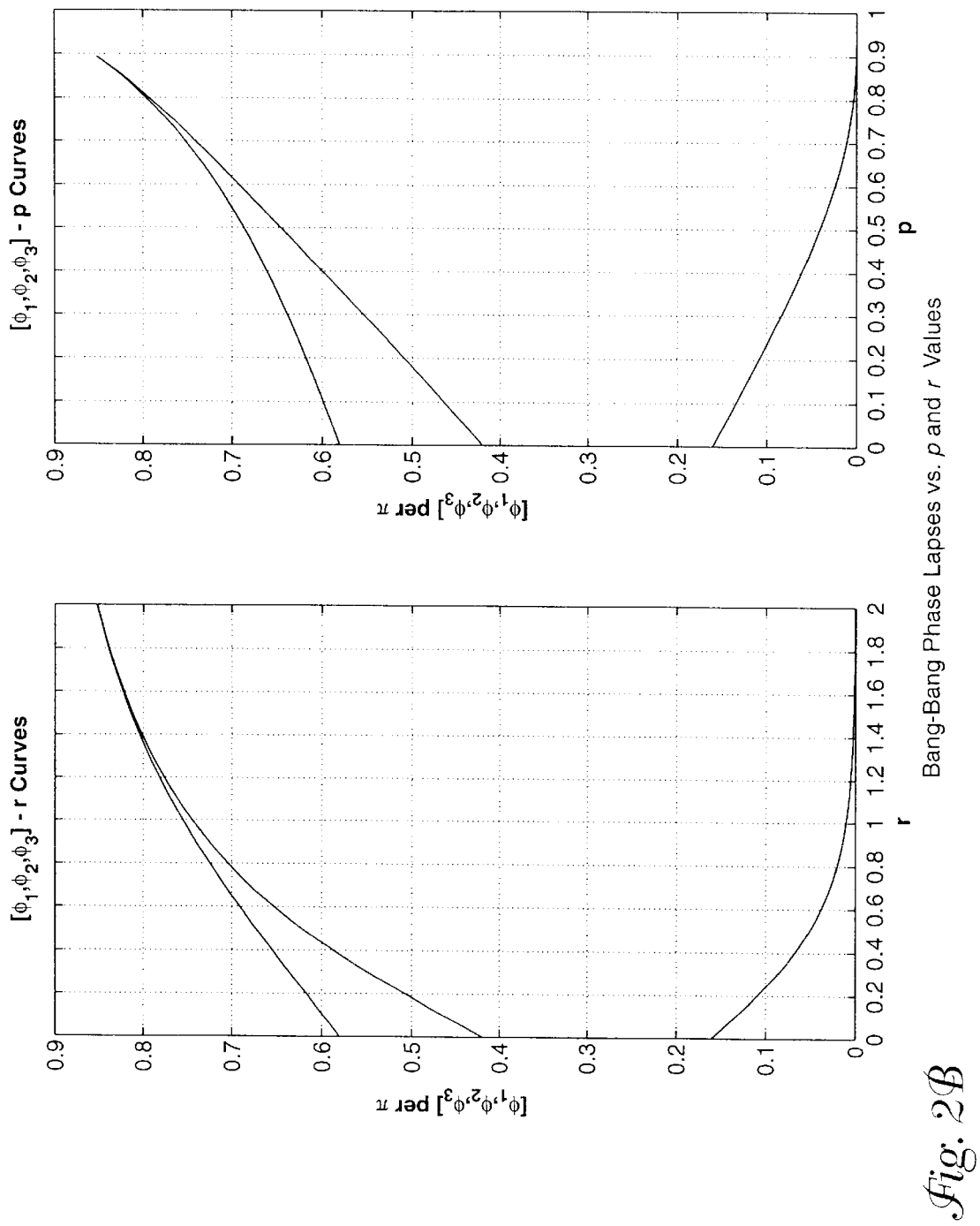
FIG. 2B is a graph of phase lapses and r and p curves according to an embodiment of the present invention.
Figure 2A:
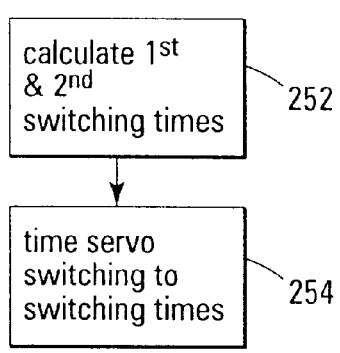
FIG. 2A is a flow chart diagram of a process according to another embodiment of the present invention.

An embodiment of an input parity switching process 250 is shown in FIG. 2A. Process 250 comprises calculating first and second times to switch the amplitude of a command in block 252, and timing the switching to those times in block 254. In one embodiment, switching means application of equation (3.1) with an amplitude of +A from a time t=0 to a determined first switching time $t_1$, with an amplitude of −A from time $t_1$ to a time $t_3=t_1+t_2$, and an amplitude of A from $t_3$ forward. This switching process 250 switches at a first time $t_1$ from an amplitude of +A to an amplitude of −A and switches back to an amplitude of +A after a lapse of a second time $t_2$. For brevity of notation, hitherto denote by $t_3:=t_1+t_2$ and $\phi_3:=\phi_1+\phi_2$.

Since (4.1) is applied with +A, at $t_1$, $$[x_1,y_1]=A[(1-e^{-r\phi_1}(\cos\phi_1+r\sin\phi_1)), d\omega e^{-r\phi_1}\sin\phi_1]. \quad (4.5)$$

Now, $[x_1,y_1]$ is the initial condition of (3.1) applied with −A. Replacing A with −A in (3.2) and (3.7) gives $$[x_3, y_3] = [-A + e^{-r\phi_2}\{(x_1 + A)\cos\phi_2 + \left[\frac{y_1}{q\omega} + r(x_1 + A)\right]\sin\phi_2\}, \quad (4.6)$$
$$e^{-r\phi_2}\{y_1\cos\phi_2 - [ry_1 + d\omega(x_1 + A)]\sin\phi_2\}]$$
$$= [A, 0].$$

Solving the second equation and substituting to simplify the first, $$e^{-r\phi_1}[\cos\phi_3, \sin\phi_3]=2[\cos\phi_2-e^{r\phi_2}, \sin\phi_2], \quad (4.7)$$

which are equivalent to $$e^{-r\phi_3}[\cos\phi_3, \sin\phi_3]=2[-(1-e^{-r\phi_2}\cos\phi_2), e^{-r\phi_2}\sin\phi_2] \quad (4.8)$$

and further to $$[e^{-2r\phi_3}, \tan\phi_3] = \left[4(1-2e^{-r\phi_2}\cos\phi_2+e^{-2r\phi_2}), -\frac{e^{-r\phi_2}\sin\phi_2}{1-e^{-r\phi_2}\cos\phi_2}\right] \quad (4.9)$$

after some algebraic manipulation (by taking square sum and ratio).

By (4.8), $\cos\phi_3<0$ and $\sin\phi_3>0$, $\pi/2<\phi_3<\pi$. Equation (4.9) now imposes a system of two nonlinear algebraic equations in two unknowns, $\phi_2$ and $\phi_3$. It is straightforward to reduce (4.9) to an equation in $\phi_2$ only:

$$e^{-2r\mu}-4w^2=0 \Leftrightarrow \mu+1/r\ln 2w=0 \quad (4.10)$$

where $$[u, v, w, \mu] := \left[1-e^{-r\phi_2}\cos\phi_2, e^{-r\phi_2}\sin\phi_2, \sqrt{u^2+v^2}, \cos^{-1}\left(-\frac{u}{w}\right)\right]. \quad (4.11)$$

Having solved $\phi_2$, the solutions for $\phi_3$ and $\phi_1$ follow. Lemma 4.1 below establishes the asymptotic behaviors of $[\phi_1,\phi_2,\phi_3]$ versus r.

Lemma 4.1. The following properties hold for the solution $[\phi_1,\phi_2]$ of (4.9):

(a) $r\phi_2<\ln 3/2 \sim 0.405465 \sim 0.129\pi$ and $r_{\phi_1}>\ln 2(e^{r\phi_2}-1)$.
(b) $0<\phi_2<\pi/2$ and $\pi/2 \leq \phi_3<\pi$.
(c) $\phi_2 \to 0$, $\phi_1 \to \pi$ and $r\phi_2 \to 0$ as $r \to \infty$.

Proof For (a), considering (4.9a) as a quadratic inequality in variable $e^{-r\phi_2}$:

$$e^{-2r\phi_2}>e^{-2r\phi_3}=4(1-2e^{-r\phi_2}\cos\phi_2+e^{-2r\phi_2})>4(1-2e^{-r\phi_2}+e^{-2r\phi_2}). \quad (4.12)$$

The inequalities require that $e^{-r\phi_2}$ lies between the two roots of the quadratic equation, viz.

$$\frac{2}{3}<\frac{2}{2+e^{-r\phi_1}}<e^{-r\phi_2}<1<\frac{2}{2-e^{-r\phi_1}}<2. \quad (4.13)$$

The first two inequalities are equivalent to $r\phi_2<\ln(1+\frac{1}{2}e^{-r\phi_1})<\ln 3/2$; the last three hold trivially. For (b), consider $$\cos\phi_3=-2e^{r\phi_1}(e^{r\phi_2}-\cos\phi_2)$$

and note that $e^{r\phi_2}-\cos\phi_2>e^{r\phi_2}>1$ if $\phi_2>\pi/2$, implying that $|\cos\phi_3|>2$. By (4.9b), $\phi_3$ must be in the second quadrant. For (c), $\sin\phi_2 \to 0^+$ and $\cos\phi_2-e^{r\phi_2} \to 0^-$, $\phi_3 \to \pi^-$ by (4.9) and (b), so $\phi_1 \to \pi^-$. Observe also that $0^+ \to e^{-r\phi_1}>e^{-r\phi_3} \to 4(1-e^{-r\phi_2})^2>0$, giving $r\phi_2 \to 0$.

The equation for $\phi_2$ is given by (4.11), more specifically, using $\cos^{-1}$ but not any of its mathematical equivalences. Indeed, $\phi_2 \sim 0$ results with attempts to solve $\phi_2$ by equating $\tan\phi_3$ instead. Note that a singularity would have emerged should $\phi_2$ be solved using $\tan^{-1}$, which would have been the most intuitive way. In fact, this is why $\cos^{-1}$, instead of $\tan^{-1}$, is introduced in (4.11). Note also that $$\phi_2<\min\left(\frac{1}{2}\pi, \frac{1}{r}\ln\frac{3}{2}\right) \quad \left(=\frac{1}{2}\pi \text{ if } p<0.25\right).$$

by Lemma 4.1 (a)–(b).

The curves of $\phi_1,\phi_2,\phi_3$ vs. r are shown in FIG. 2B.

The $\phi_1$ and $\phi_3$ curves have not extended to their asymptotic value $\pi$ as it becomes numerically more and more difficult. Indeed, r=2 corresponds to $p=2/\sqrt{5} \sim 0.8944$ and r would increase more abruptly as p gets closer to 1 as $$\frac{dr}{dp} = (1-p^2)^{-3/2}.$$

An artificial remedy is to set $\phi_2$ to 0 for r>1.5. The $[\phi_1,\phi_2,\phi_3]$–p subplot is given also to highlight this numerical difficulty.

The solution of (4.9) is a function of r which expectedly cannot be given as a closed form formula in terms of p and w. Nonetheless, by curve-fitting the solutions, the goal to achieve $[x(t_3),y(t_3)]=[A,0]$ can be achieved.

$$[\phi_1, \phi_2, \phi_3] = [1.3181 + 1.8235(1-e^{-0.785r}), 0.5054e^{-1.525r}, \quad (4.14)$$
$$1.8235 + 1.3181(1-e^{-0.44r})]$$
$$= \frac{\pi}{50}[21 + 29(1-e^{-0.25r\pi}), 8e^{-0.485r\pi},$$
$$29 + 21(1-e^{-0.14r\pi})].$$

The equation (4.14) terms are obtained by curve-fitting with respect to r<<1 (highly underdamped). To consider in addition the cases with r~1 (moderately underdamped) and r>10 (slightly underdamped), (4.14) can be given in form of piecewise-defined functions for best quality of fit. Note that curve-fitting, if done properly, reduces the time/cost to recalculate new timings given a new p. For example, if the command input to the servo changes, the p and w values are placed in the equation (4.14) to generate new switching times.

Theorem 4.2. Consider (4.1). Then: For any $0 \leq p \leq 1$, there exists a unique pair of switching times $t_1, t_2 > 0$ such that $x(t)=A$ for all $t \geq t_3 = t_1 + t_2$ which is minimum time. Moreover, $[t_1, t_2]$ can be given by the solution of the system (4.9), which can be solved from (4.11), whereas (4.14) provides approximations, as functions for r for $t_1, t_2, t_3$, respectively.

Setting r=0, viz. p=0, results in $$[\cos \phi_3, \sin \phi_3] = [2(\cos \phi_2 - 1), 2 \sin \phi_2]. \quad (4.15)$$

Since $|\sin \theta| \leq 1$ and $|\cos \theta| \leq 1$, $0 < \phi_2 \geq \frac{\pi}{2}$ and $\phi_1 + \phi_2 \geq \pi/2$ follow, which further imply that $$\cos \phi_3 \geq 2\left(\frac{\sqrt{3}}{2} - 1\right) = \sqrt{3} - 2.$$

Hence, $\phi_1 + \phi_2 \leq \cos^{-1}(\sqrt{3}-2) = 1.84206 \sim \frac{7}{12}\pi$ follows. The numbers given in (4.14) were obtained numerically, however. Those for $\phi_1$ were taken by subtraction $\phi_3 - \phi_2$. Note:

$$0.505353 \sim \frac{4}{25}\pi < \frac{1}{6}\pi \text{ and } 1.8234826 \sim \frac{29}{50}\pi < \frac{7}{12}\pi.$$

Note also that $[\phi_1, \phi_2]$ exists for all r>0 and that there is no finite singularity in (4.10)–(411).

Elementary manipulations also yield $$[\cos \phi_1, \sin \phi_1] = [2e^{r\phi_3}(e^{-r\phi_2} - \cos \phi_2), 2e^{r\phi_3} \sin \phi_2], \quad (4.16)$$

(4.10) and $$\tan \phi_1 = \frac{\sin \phi_2}{e^{-r\phi_2} - \cos \phi_2} = \frac{v}{w^2 - u}. \quad (4.17)$$

The similarities in appearances between these and equations (4.8)–(4.10) include that they behave quasi-linearly or preserve some sort of symmetry. In fact, an equivalence of (4.10) reducing $\phi_2$ instead of $\phi_3$ is shown later.

Maximum-Amplitude Switching

Figure 3A:
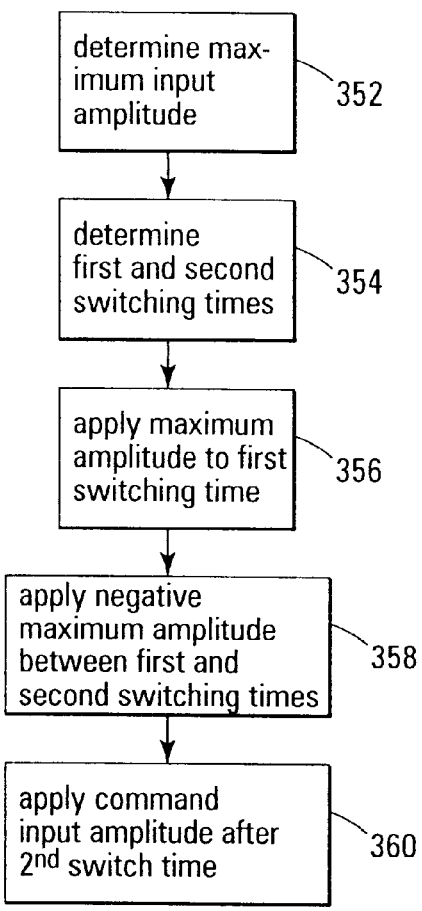
FIG. 3A is a flow chart diagram of a process according to still another embodiment of the present invention.
Figure 3:
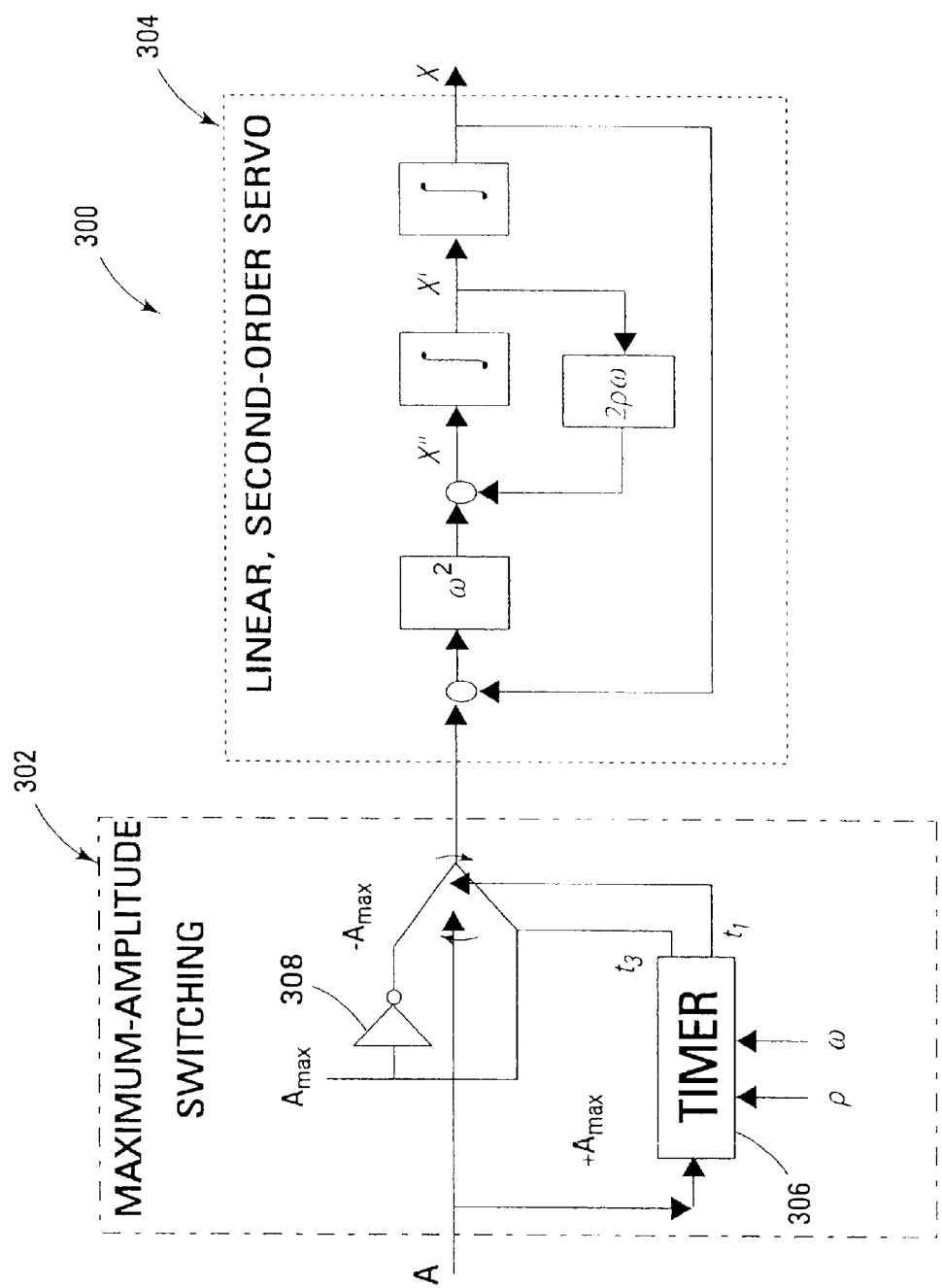
FIG. 3 is a block diagram of still another embodiment of a servo system.

FIG. 3 is a block diagram of an embodiment 300 of a servo system employing maximum amplitude switching as described in greater detail above. Servo system 300 comprises a switching element 302 and a servo 304. Switching element 302 accepts an input amplitude A, and outputs an amplitude to the servo 304. Switching element 302 includes a timer 306, and an inverter 308. The switching process of switching element 302 is pre-programmed with a maximum amplitude Amax for the particular servo 304 to which it is connected. The timer is coordinated to provide the output amplitude $A_{max}$ to the servo 304 for a time period from 0 to time $t_1$. At time $t_1$, the timer switches the amplitude of the output to $-A_{max}$, and provides that amplitude $-A_{max}$ to servo 304 for a time $t_2$. In this embodiment, another switching is effected at a time $t_3 = t_1 + t_2$. In this embodiment, the original command level amplitude A is passed to the servo 304 from time $t_3$ onward. FIG. 10 shows an expected settling time for a servo system of this embodiment compared with other servo settling embodiments described herein. From FIG. 10, it is seen that improvement over unswitched serve systems is quite noticeable.

An embodiment of maximum amplitude switching process 350 is shown in FIG. 3A. Process 350 comprises determining a maximum input amplitude for a servo in block 352, determining first and second switching times in block 354, applying the maximum amplitude to the servo from time 0 to the first switching time in block 356, applying the negative maximum amplitude to the servo from the first switching time for the second switching time in block 358, and applying the command input amplitude from the second switching time forward in block 360.

The third switching process uses some extra degree of freedom, the resulting settling time is shorter than that from the input-parity switching process 250 described above.

Specifically, applying (4.1) with $[A_1, t_1]$ followed by $[-A_2, t_2]$ ($A_1$ and $A_2$ are not 'related' with the commanded constant input A), (4.6) still applies, while (4.7) becomes $$[x_3, y_3] = \quad (4.18)$$
$$\left[-A_2 + e^{-r\phi_2}\left\{(x_1 + A_2)\cos\phi_2 + \left[\frac{y_1}{q\omega} + r(x_1 + A_2)\right]\sin\phi_2\right\},\right.$$
$$\left. e^{-r\phi_2}\{y_1\cos\phi_2 - [ry_1 + d\omega(x_1 + A_2)]\sin\phi_2\}\right] = [A, 0]$$

and further, reduces to $$e^{-r\phi_3}[\cos \phi_3, \sin \phi_3] = [(1-\mu)-(1+\rho)(1-e^{-r\phi_2}\cos \phi_2), (1+\rho)e^{-r\phi_2}\sin \phi_2] \quad (4.19)$$

where $$[\rho, \mu] := \left[\frac{A_2}{A_1}, \frac{A}{A_1}\right]. \quad (4.20)$$

The rest of the work is similar to the solution process for the input parity switching case, except that the solution for $[\phi_1, \phi_2, \phi_3]$ will be a function of $[A_1, A_2]$. The resulting settling phase $\phi_3$ is tabulated against $A_1$ and $A_2$ and the minimum is located; the minimizer $[A_1^* = A_2^*]$ is $$A_1^* = A_2^* = A_{max} \Rightarrow [\rho^*, \mu^*] = \left[1, \frac{A}{A_{max}}\right] \quad (4.21)$$

from which the name maximum amplitude switching is derived, which reduces (4.19) to $$e^{-r\phi_3}[\cos \phi_3, \sin \phi_3] = [(1-\mu^*)-2(1-e^{-r\phi_2}\cos \phi_2), 2e^{-r}\phi^2 \sin \phi_2] \quad (4.22)$$

(cf. (4.9)).

Figure 3B:
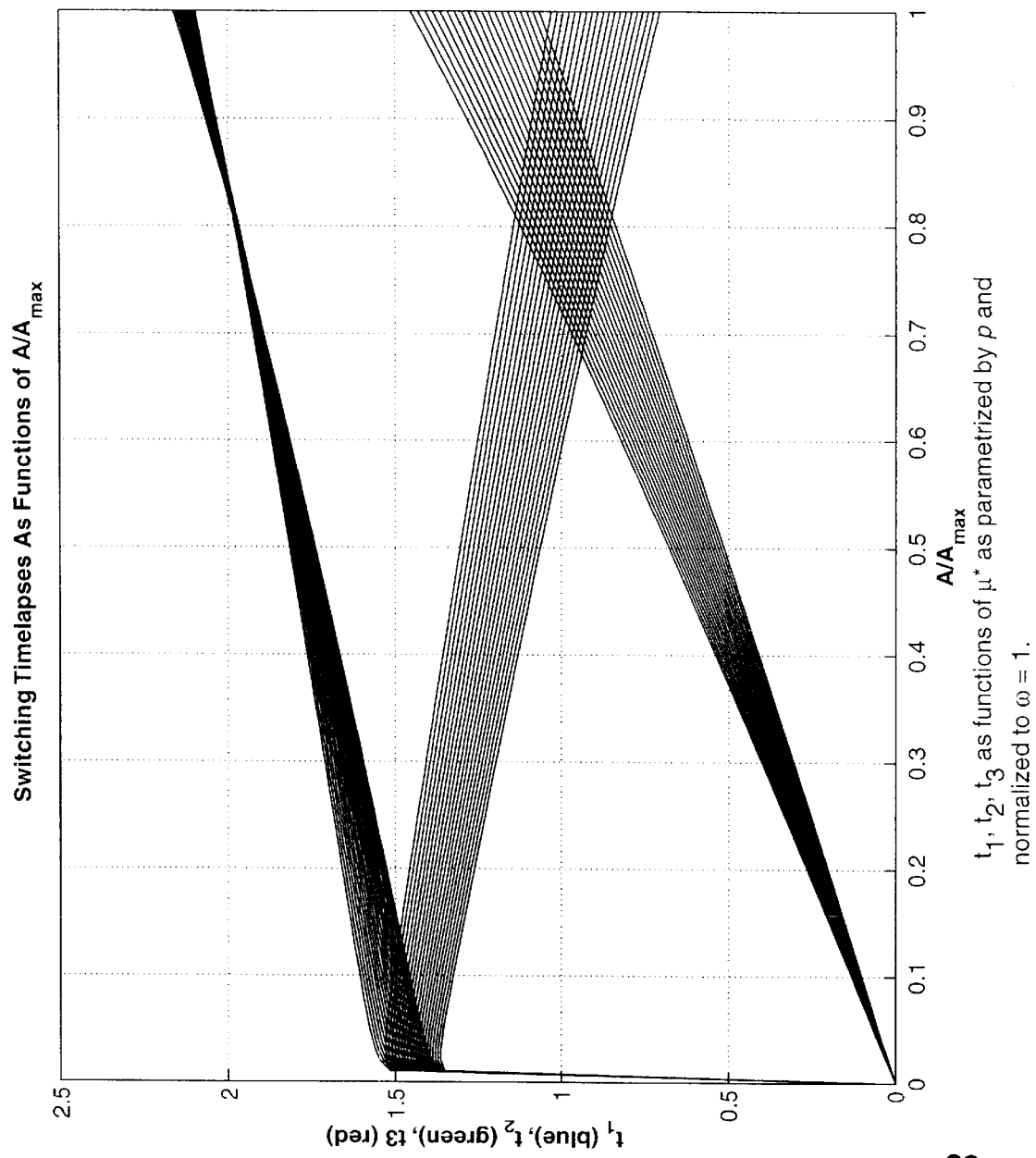
FIG. 3B is a graph of sample switching times as a function of $\mu^*$ according to an embodiment of the present invention.

FIG. 3B plots $[t_1, t_2, t_3]$ as a function of $\mu^*$. The characteristics of the switching times as functions of $A/A_{max}$ as well as of p are quite linear.

$$[\phi_1, \phi_2, \phi_3] = [\phi_1^{\kappa} - \phi_{10})\mu^* + \quad (4.23)$$
$$\phi_{10}, (\phi_2^{\kappa} - \phi_{20})\mu^* + \phi_{20}, (\phi_3^{\kappa} - \phi_{30})\mu^* + \phi_{30}]$$

where $\phi_1^{\kappa}$, $\phi_2^{\kappa}$ and $\phi_3^{\kappa}$ are as given by the right-hand sides of (4.16). Note in particular, that there is a cross-over in $t_3$ at $\mu^* \sim 0.8$, suggesting that employing a smaller ratio $\mu^* > 0.8$ works better for larger p, and vice versa.

In comparison to the input-parity switching process 250, the switching phases now do depend upon A, or, more precisely, on the ratio $\mu^*$. Consequently, whenever a new commanded input arrives, the switching times are re-computed. This can certainly be made costless by using curve-fitting. The extra effort does offer shorter settling time. In fact, the maximum amplitude switching reduces the settling time by as much as 50% for $\mu^*=\frac{1}{2}$; for smaller A the settling time gets even smaller. This reduction proves very helpful for the servomechanism applied with multiple command inputs, i.e., a servomechanism in continuous operation.

While no attempt would be given to prove any optimality of (4.21), which applies to any A, it is worthwhile to point out its bang-bang nature. Note that as a common practice (at least in some bang-bang control texts), the 'bang' is often normalized with respect to the commanded input A. (Note that this, as a matter of fact, corresponds to the input-parity switching process.) As such, some better results may have been overlooked when there are more than one commanded input considered. However, the better results, if any, will readily fall from the application of the relevant equations and are within the scope of the present invention.

Turning-Points Input-Parity Switching

An alternative embodiment of the on-the-dot switchings described above, namely shrunk fit, input parity, and maximum amplitude switching, in which all the switching times are numerically obtained, is a slightly less analytical, closed-form switching scheme as described below. Select the switching times $t_1$ and $t_2$ as the first y-turning and x-turning times (from $t_1$ onward).

When (4.1) attains its maximum velocity at $t_1$, the 'moment of inertia' sustains and counters the new input $-A$ for a certain period of time. The new input $-A$ is injected so as to reduce the overshoot of (4.1). The velocity remains positive at this time. Switching the input parity to $-A$ begins to reverse the 'uphill' trend to be 'downhill,' which needs to be reversed again at some time. A natural candidate for $t_2$ is when (4.1) attains its (next) extremum x. The results of this switching process are analyzed below.

From (3.3), $$y' = we^{-r\phi}\{-[2py_0 + w(x_0 - A)]\cos\phi + \qquad (4.24)$$
$$[(pr - q)y_0 + rw(x_0 - A)]\sin\phi\}$$
$$= \omega^2 A e^{-r\phi}(\cos\phi - r\sin\phi),$$

from which $\cos\phi = r\sin\phi$ at $y'=0$, viz.

$$[\phi_1, x_1, y_1] = [\alpha, A(1-2pe^{-r\alpha}), A\omega e^{-r\alpha}] \qquad (4.25)$$

where $[x_1, y_1]$ becomes the initial condition for the second leg, i.e., (4.1) applied with $-A$. By replacing A with $-A$, from (3.27), $$\left[\frac{x_1}{A}, \eta, a', b, c', \phi_2\right] = \left[2pe^{-r\alpha} - \qquad (4.26)\right.$$
$$\left. 1, -e^{-r\alpha}, 2 - pe^{-r\alpha}, -qe^{-r\alpha}, \sqrt{4 - 4pe^{-r\alpha} + e^{-2r\alpha}}, \cos^{-1}\frac{a'}{c'}\right].$$

In this situation, $a'>0$ and $b<0$. Moreover, the situation here is different from solving for the excursion: A search is made for the very first phase $\phi_2$ or time opportunity such that y=0 for the next switching, back to $+A$. By (4.7), $$x_3 = e^{-r\phi_2}\left\{2A(1 - pe^{-r\alpha})\frac{a'}{c'} + [dAe^{-r\alpha} + r2A(1 - pe^{-r\alpha})]\frac{qe^{-r\alpha}}{c'}\right\} - \qquad (4.27)$$
$$A = A(-1 + c'e^{-r\phi_2})$$

after algebraic manipulation. Thus, $[x_3, 0]$ is at hand to use Theorem 3.1. With $\epsilon_3 = 1 - x_3/A = 2 - c'e^{-r\phi_2}$, $$\bar{t} = \frac{1}{q\omega}\left(\alpha + \right. \qquad (4.28)$$
$$\left. \cos^{-1} 2 - \frac{pe^{-r\alpha}}{\sqrt{4 - 4pe^{-r\alpha} + e^{-2r\alpha}}} + \pi \cdot \left[\frac{\sigma + \ln|2 - c'e^{-r\phi_2}|}{r\pi}\right]\right).$$

As a numerical example, with p=0.1 and σ=3, $\bar{t}$=1.471+0.422=1.892=0.6023π. Note that $|\epsilon_3|<\bar{\epsilon}$ in this case.

Any process involving a servo is amenable to the processes described herein. Thus, any second order servo application, such as tank turret control servos, angle to angle servos, targeting servos, and the like are applicable to the methods described herein.

On-the-Dot Switching With Non-Zero Initial Velocity

The above described embodiments have been analyzed with respect to an initial velocity of zero. However, in many situations, nonzero velocity is encountered in a switching process. For example, if a command is given to rotate a servo from a first angular position to a second angular position, and an intervening command is given to or received by the servo to move the servo to a third angular position before the servo has settled at the second angular position, it would be desirable to abort the command to move to the second angular position, and instead move directly toward the third angular position. However, in this situation, the servo is moving toward the second angular position, and therefore has an initial velocity which is not zero.

As noted previously, if the new servo command arrives prior to completion of a servo command (applying one the described switching process embodiments, for instance), a 'hangover,' remnant velocity will be the initial velocity for the new commanded input. If this remnant velocity is small, it can be taken as a perturbation. While applying the previous derived scheduling will witness some ripples, the switching process will still settle fast, as will be shown by simulation in the next section. A significant initial velocity is ensued, however, if the new command arrives abruptly. The scheduling of the switching process is therefore modified in another embodiment described below. The modification is sketched as follows.

Consider $$x''+2p\omega x'+\omega^2 x=\omega^2 A, \ x(0)=0, x'(0)=y_0\neq 0. \qquad (5.1)$$

For the shrunk-fit switching process 150, the equations to be solved are $$A_1[1-e^{-r\phi}(\cos\phi+(r-d\eta)\sin\phi), \ d\omega e^{-r\phi}(b\cos\phi+a\sin\phi)]=[A,0] \ [5.2]$$

The second equation is solved for $\phi_1$, substituted to the first equation, and solved for $A_1$. The solution of $b\cos\phi+a\sin\phi=0$ is now subject to a different requirement. Indeed, $$\cos\phi = \tag{5.3}$$

$$-\frac{a}{b}\sin\phi \Rightarrow A_1\{1-e^{-r\phi}[\cos\phi+(r-d\eta)\sin\phi]=A_1\{1+c^2e^{-r\phi}\sin\frac{\phi}{b}\}$$

which implies that necessarily, $\sin \phi=b/c,-b/c$ if $A_1<A$, $A_1>A$, respectively. With the notation in (3.21), the following is obtained:

Theorem 5.1. (Shrunk-Fit Switching Process) For (5.1), the command schedule $[\phi_1,A_1]$ can be given either by $$\left[\hat{\beta},\frac{A}{1+ce^{-r\hat{\beta}}}\right] \text{ or by } \left[\check{\beta},\frac{A}{1-ce^{-r\check{\beta}}}\right];$$

the latter applies provided that $A<A_{max}(1-ce^{-r\check{\beta}})$.

For the input-parity switching process, obtained in parallel to (4.5)–(4.6), $$e^{-r\phi_1}[a\cos\phi_3-b\sin\phi_3,a\sin\phi_3+b\cos\phi_3]=[2(\cos\phi_2-e^{r\phi_2}),2\sin\phi_2], \tag{5.4}$$

from which $$e^{-r\phi_3}[a\cos\phi_3-b\sin\phi_3,a\sin\phi_3+b\cos\phi_3]=[-2u,2v] \tag{5.5}$$

and then $$e^{-2r\phi_3}=4\frac{w^2}{c^2}=4\frac{1-2e^{-r\phi_2}\cos\phi_2+e^{-2r\phi_2}}{1-2p\eta+\eta^2}, \tag{5.6}$$

$$\frac{a\sin\phi_3+b\cos\phi_3}{a\cos\phi_3-b\sin\phi_3}=-\frac{v}{u}\rightarrow\tan\phi_3=-\frac{av+bu}{au-bv}\Rightarrow\phi_3=\hat{v} \tag{5.7}$$

where the $(\hat{\cdot})$-notation is again employed in (3.21) with $$v:=\sin^{-1}\left(\frac{av+bu}{cw}\right). \tag{5.8}$$

Note that $v\rightarrow\beta$ (see (3.21)) as $r\rightarrow\infty$.

Moreover, the problem has now been complicated by $\eta$ via $v$: In comparison, $\mu$ the counterpart of $v$ or $\nu$, rather, is definite because the sign of $u$ is definite, while that of $au-bv$ depends on $\eta$.

In parallel to (4.10), $$e^{-2r\hat{v}}-4\frac{w^2}{c^2}=0\Leftrightarrow\hat{v}+\frac{1}{r}\ln2\frac{w}{c}=0. \tag{5.9}$$

More general but less conclusive, Lemma 5.1 below is the counterpart of Lemma 4.1.

Lemma 5.1. The following properties hold for the solution $[\phi_1,\phi_2]$ of (5.5):

(a) $\phi_2<\frac{1}{r}\ln\left(1+\frac{c}{2}\right)$.

(b) $0<\phi_2\leq\pi/2$ if $c\leq2$ ($\Leftrightarrow\rho_-\leq\eta\leq\eta_+$ (see (4.13)).
(c) There exist $\eta^-<0$ and $\eta^0>\eta^{+p>0}$ such that $\pi/2<\phi_3<\pi$ for $\eta\in[\eta^-,\eta^+]$, $\pi<\phi_3<\frac{3}{2}\pi$ for $\eta_-<\eta<\eta^-$, $\phi_3<\pi/2$ for $\eta_+<\eta<\eta^0$, and no solution exists for $\eta>\eta^0$.

(d) $\phi_2\rightarrow0$ and $\phi_1\rightarrow\hat{\beta}$ as $r\rightarrow\infty$ if $c<2$.

Proof: For (a), from (5.6) and in parallel to (4.13)

$$\left(1-\frac{c^2}{4}\right)e^{-2r\phi_2}-2e^{-r\phi_2}+1= \tag{5.10}$$

$$\left(1-\frac{c^2}{4}\right)\left(e^{-r\phi_2}-\frac{2}{2-c}\right)\left(e^{-r\phi_2}-\frac{2}{2+c}\right)<0.$$

If $$c<2, 1-\frac{c^2}{4}>0, \text{ so } \frac{2}{2+c}<e^{-r\phi_2}<1<\frac{2}{2-c},$$

whereas if $$c>2, 1-\frac{c^2}{4}<0, e^{-r\phi_2}-\frac{2}{2-c}>0$$

automatically, which leaves satisfaction of (5.10) to $e^{-r\phi_2}>2/2+c$ only. For (b), consider $$1\geq\cos\left(\phi_3+\cos^{-1}\frac{a}{c}\right)=-\frac{2}{c}e^{r\phi_1}(e^{-r\phi_2}-\cos\phi_2)$$

and recall Lemma 4.1(b). For (c), with $\phi_2<\pi/2$, $a\sin\phi_3+b\cos\phi_3>0$ and $a\cos\phi_3-b\sin\phi_3>0$. It is straightforward to see that if $(a,b)$ has the sign combination $(+,+)$, $(+,-)$, or $(-,+)$, respectively, $\phi_3$ must be in either first or second, either second or third, and either first or fourth. The ambivalences can then be reduced by virtue of continuity from the case with $y_0=0$.

It is clear that while $\phi_1=0\Leftrightarrow\phi_2=\phi_3$ has no solution by simply examining (4.8), a solution for (5.10) actually exists for a unique $\eta>0$. Indeed, by (5.10), (5.4) is reduced to $$(2-a)\sin\phi_2= \tag{5.11}$$

$$b\cos\phi_2\Leftrightarrow(1+p\eta)\sin\phi_2=q\eta\cos\phi_2\Rightarrow\tan\phi_2=\frac{b}{2-a}=\frac{q\eta}{1+p\eta}.$$

This, together with (5.3), leads to $$\frac{(2-a)^2+b^2}{b}\sin\phi_2=2e^{r\phi_2}. \tag{5.12}$$

It follows that $b\sin\phi_2>0$, reducing (5.11) to $$\sin\phi_2=\frac{b}{\sqrt{(2-a)^2+b^2}}$$

and further to $$\phi_2=\begin{cases}\sin^{-1}\frac{q\eta}{\sqrt{(2-a)^2+b^2}}, & \eta>0,\\ \pi-\sin^{-1}\frac{q\eta}{\sqrt{(2-a)^2+b^2}}, & \eta<0\end{cases} \tag{5.13}$$

$$=sgn(\eta)\sin^{-1}\frac{q\eta}{\sqrt{(2-a)^2+b^2}}+\frac{\pi}{2}[1-sgn(\eta)]$$

and (5.12) to $$2e^{r\phi_2}=\sqrt{(2-a)^2+b^2}=\sqrt{1+2p\eta+\eta^2}. \tag{5.14}$$

Figure 4:
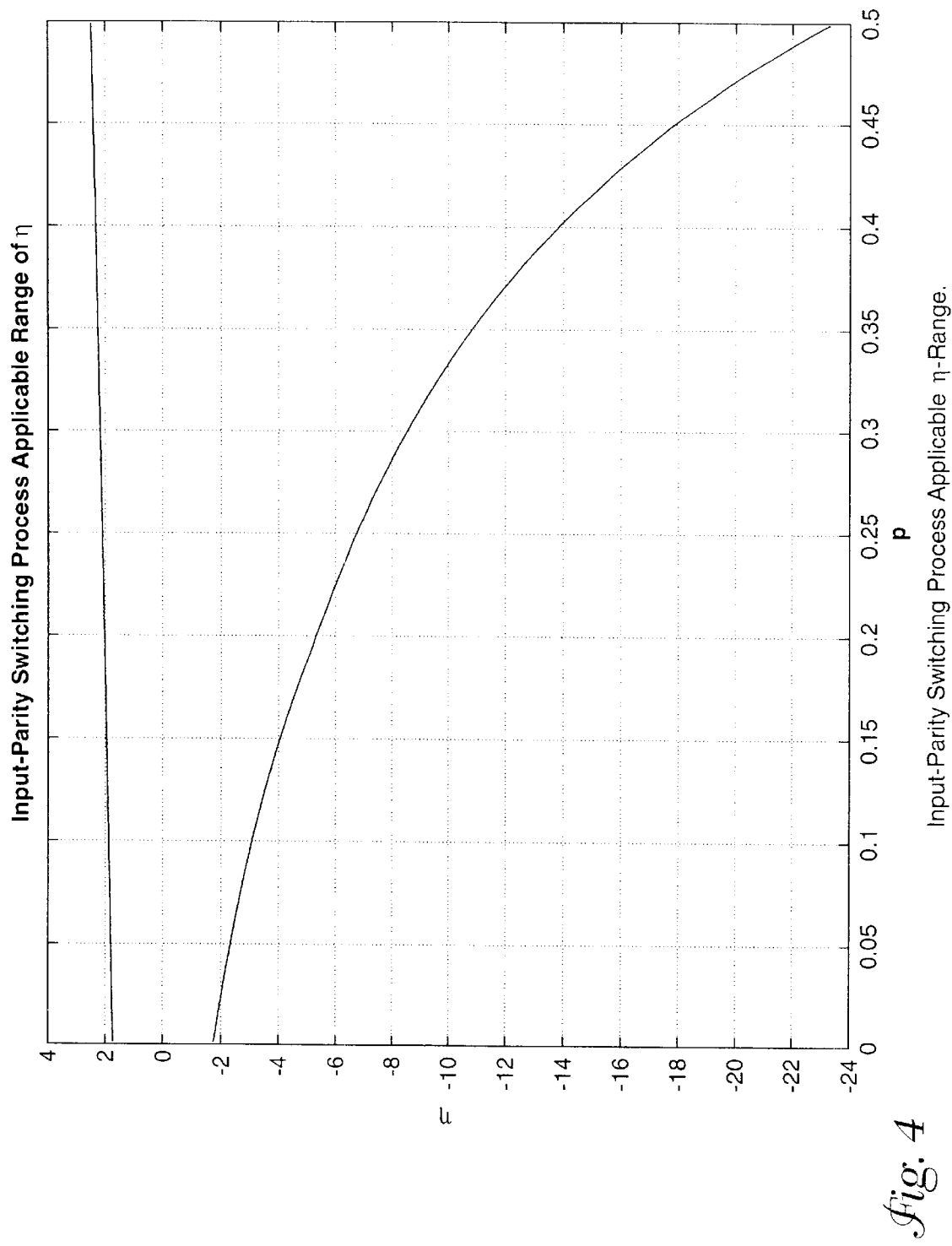
FIG. 4 is a graph of a plot of a solution for a switching equation according to one embodiment of the present invention.

We thus have $$\Phi_p(\eta) := \tag{5.15}$$
$$\frac{1}{r}\ln\frac{1}{2}\sqrt{1+2p\eta+\eta^2} - \sin^{-1}\frac{q\eta}{\sqrt{(2-a)^2+b^2}} - \frac{\pi}{2}[1-sgn(\eta)] = 0,$$

an equation in $\eta$. Evidently, $\Phi_{0.1}(0)=-10\ln 2<0$. By the facts that $\Phi_{0.1}(0)\Phi_{0.1}(3.2)<0$ and $\Phi_{0.1}(-2)\Phi_{0.1}(-3)<0$, solutions for $\Phi_p(\eta)=0$ exist for $0<\eta<2$ and $-3<\eta<-2$ for p=0.1, for instance. Via numerical (bi-section) search, the solution $\eta$ of (5.15) is plotted in FIG. 4 as a function of p.

Figure 5:
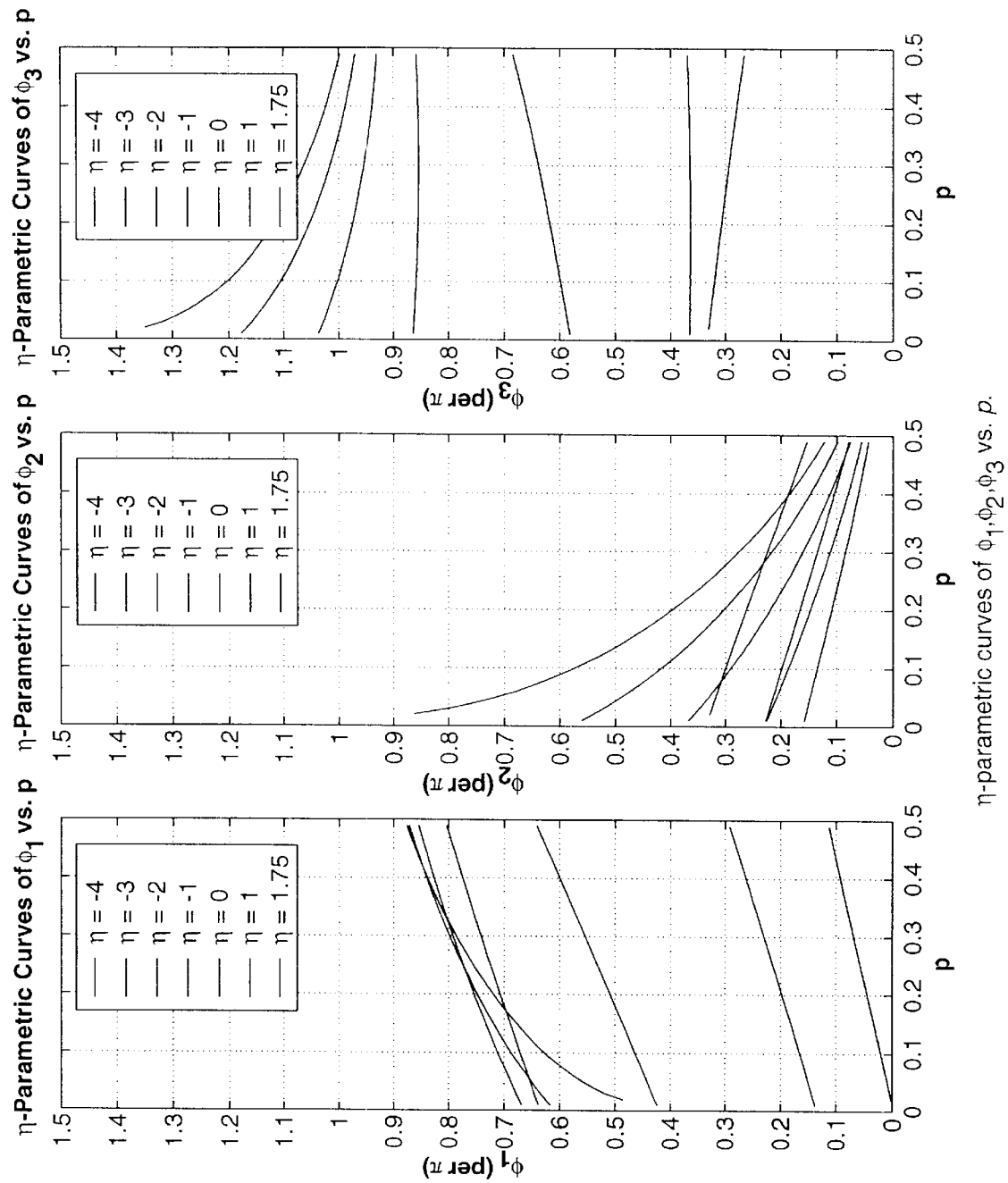
FIGS. 5 and 6 are graphs of plots of parametric curves according to various embodiments of the present invention.
Figure 6:
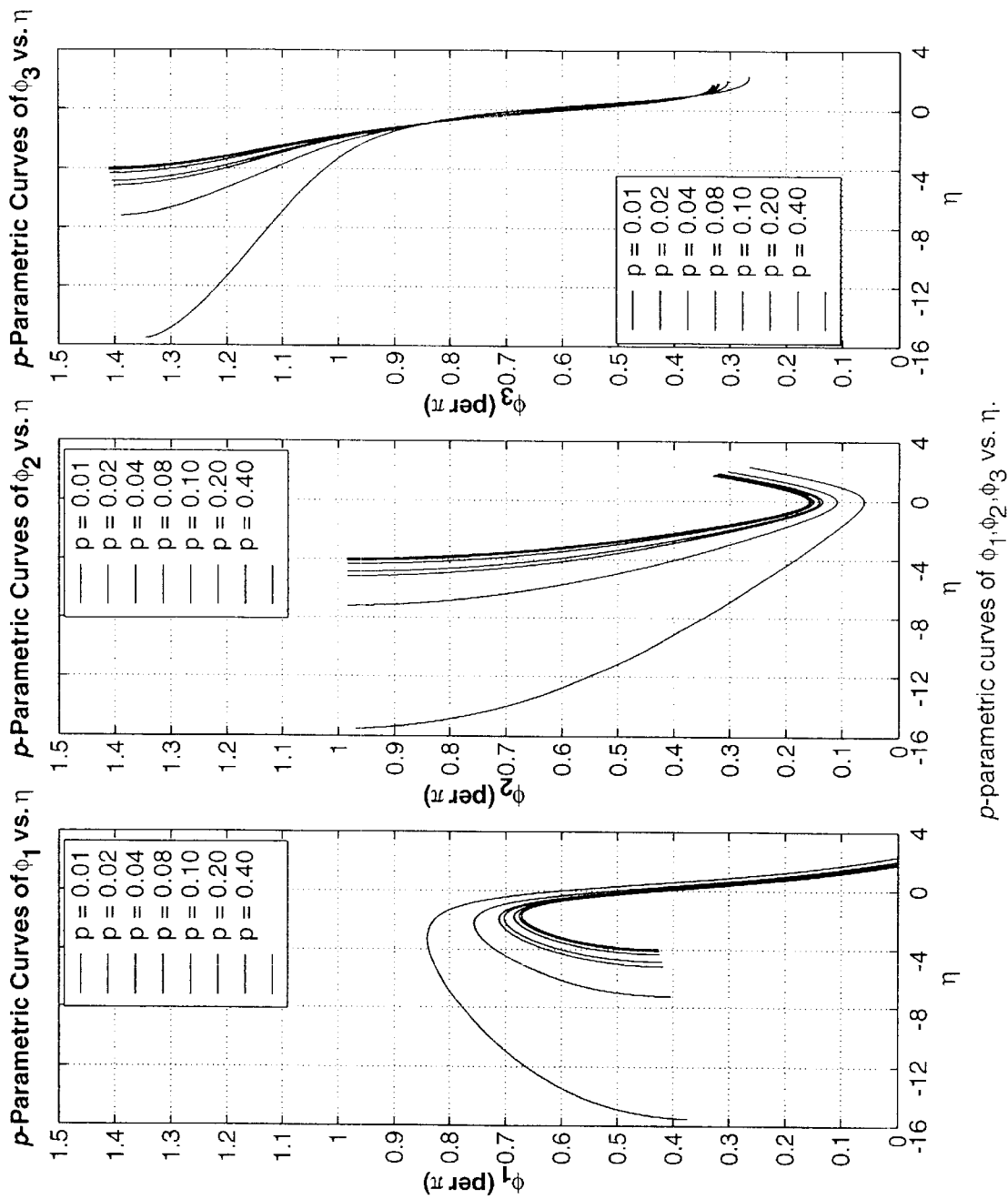

Note that $\eta\to\pm\sqrt{3}$ as $p\to 0$. Moreover, the obtained branches of solutions fit $$[\eta_+, \eta_-]=[\sqrt{3}+151286p, \sqrt{3}e^{5.25P}], \tag{5.16}$$

rather well. The $[\phi_1,\phi_2,\phi_3]$-curves, as $\eta$-parametric and p-parametric functions of p and of $\eta$ are depicted in FIGS. 5 and 6, respectively. For comparison (and programming convenience, as well), the portions of curves which went beyond the interval in which $\phi_1>0$ are retained.

Note that for small $y_0$, the switching phases are rather linear. The simple "linearity" may be useful for predicting/modifying the switching phases from those obtained for $[x_0,y_0]=[0,0]$.

The analysis for input parity (250) and maximum amplitude (350) switching processes are shown in parallel below. The governing equation is a hybrid of equations (4.21) and (5.5):

$$e^{-r\phi_3}[a_1\cos\phi_3 - b_1\sin\phi_3, a_1\sin\phi_3 + b_1\cos\phi_3] = [(1-\mu)-(1+\rho)u, (1+\rho)v] \tag{5.17}$$

where $[\rho,u]$ are as defined in (4.22), [u,v] is as given in (4.13), $$\eta_1 := \frac{y_0}{\omega A_1}$$

and $[a_1,b_1]:=[1-p\eta_1, q\eta_1]$. In parallel to those from (5.6) to (5.15), $$e^{-2r\phi_3} = (1+\rho)^2 u'^2 + \frac{v^2}{a_1^2+b_1^2}, \tag{5.18}$$

$$\frac{a_1\sin\phi_3 + b_1\cos\phi_3}{a_1\cos\phi_3 - b_1\sin\phi_3} = -\frac{v}{u'} \to \tan\phi_3 = -\frac{a_1v + b_1u'}{au' - bv} \Rightarrow \phi_3 = \hat{v}' \tag{5.19}$$

where $$u' := u - \frac{1-u}{1+\rho} \text{ and } v' := \sin^{-1}\left(\frac{a_1v+b_1u'}{a_1u'-b_1v}\right), \tag{5.20}$$

and it follows that $$e^{-2r\hat{v}'} - (1+\rho)^2 u'^2 + \frac{v^2}{a_1^2+b_1^2} = \tag{5.21}$$
$$0 \Leftrightarrow n\hat{u}' + \frac{1}{2r}\ln(1+\rho)^2 u'^2 + \frac{v^2}{a_1^2+b_1^2} = 0.$$

Real Mode Switching Processes

While the described embodiments have been discussed with respect to underdamped servo systems, the principles apply as well to embodiments having overdamped systems where p>1. When the servo is unstable, but has real eigenvalues, no solutions to the timing equations exist. However, in certain situations of unstable servos, where the instability meets certain conditions, solutions still exist for the timing equations. For example, if the eigenvalues of a servo are complex conjugates, solutions exist whether the servo is unstable or not. In essence, if the damping ratio p of an unstable servo meets the condition 0>p>-1, then the servo, while unstable, is not too unstable to solve, and solutions exist. For damping ratios of p<-1, no solutions exist.

In these embodiments, the overdamped counterpart of (4.1) and §4 becomes:

$$x''+2p\omega x'+\omega^2 x=\omega^2 A, \ p>1 \text{ and } [x,x']=[0,0]. \tag{6.1}$$

It should be understood that such analysis also applies to nonzero initial velocity, as one of skill in the art would readily observe.

Denote by $[q,r,\phi,\phi_1]:=[\sqrt{p^2-1},p/q,q\omega t,q\omega t_i]$. Then the two associated characteristic roots are given by $$[s_1,s_2]=-q\omega[r-1,r+1] \tag{6.2}$$

Setting $x=c_1e^{s_1t}+c_2e^{s_2t}+A$ so that $y=x'=c_1s_1e^{s_1t}+c_2s_2e^{s_2t}$, and solving for $c_1, c_2$ and then for x,y as $$x = A + \frac{1}{2}\left[(1+r)(x_0-A)+\frac{y_0}{q\omega}\right]e^{-(r-1)\phi_1} + \tag{6.3}$$
$$\frac{1}{2}\left[(1-r)(x_0-A)-\frac{y_0}{q\omega}\right]e^{-(r+1)\phi_1},$$

$$y = -\frac{1}{2}[q\omega(r^2-1)(x_0-A)+(r-1)y_0]e^{-(r-1)\phi_1} \tag{6.4}$$
$$+\frac{1}{2}[q\omega(r^2-1)(x_0-A)+(r+1)y_0]e^{-(r+1)\phi_1}.$$

If $x_0=0$, $y_0=0$, (6.3)–(6.4) reduce to $$[x,y]=[A\{1-\frac{1}{2}[(1+r)e^{-(r-1)\phi}+(1-r)e^{-(r+1)\phi}]\}, \frac{1}{2}q\omega[e^{-(r-1)\phi}-e^{-(r+1)\phi}]] \tag{6.5}$$

Natural Settling Time

While knowing x<A (assuming A>0), there appears no simple, analytical way to find settling time via solving min $\phi>0$ from the defining inequality $$\bar{\epsilon} \geq \frac{A-x}{A} = \frac{1}{2}[(1+r)e^{-(r-1)\phi}+(1-r)e^{-(r+1)\phi}]. \tag{6.6}$$

By numerical search and curve-fitting (with a trivial range of deviation), however, the settling time (normalized by $\omega=1$) as a function of p and $\bar{\epsilon}$ is obtained:

$$\bar{t} = \begin{cases} (-9542.38\,\bar{\epsilon}^3 + 2188.67\,\bar{\epsilon}^2 - 192.13\,\bar{\epsilon} + 11.68)p + (3376.99\,\bar{\epsilon}^3 - 776.04\,\bar{\epsilon}^2 + 68.20\,\bar{\epsilon} - 3.32) \\ (3376.99 - 9542.38p)\,\bar{\epsilon}^3 + (2188.67p - 776.04)\,\bar{\epsilon}^2 + (68.20 - 192.13p)\,\bar{\epsilon} + 11.68p - 3.32. \end{cases} \quad (6.7)$$

The settling time is nearly linear in p.

For (numerical) examples, $\bar{\epsilon}=5\%$, p=1.1 1.2 1.3 1.4 15 1.6 1.7 1.8 1.9 2.0 2.1 2.2 2.3 2.4 t=5.47 6.19 6.89 757 8.24 8.89 953 10.17 10.81 11.44 12.06 12.69 13.31 13.93 and for p=2, $\bar{\epsilon}$=1% 2% 3% 4% 5% 6% 7% 8% 9% 10%

$\bar{t}$=17.44 14.85 13.34 12.27 1 1.44 10.76 10.18 9.69 9.25 8.85.

Settling Time With Switching

Observe first that $e^{-(r-1)\phi} - e^{-(r+1)\phi} \neq 0$ for all t>0, i.e., there exist no x- nor y-turning points if $|p|>1$. As such, for one thing the Shrunk-Fit switching process 150 does not apply to any real-mode case. Note also that $A_1=A$ under process 150 (even with approximation).

The following considers the input-parity switching process 250 for (6.1), by applying switching commands $[+A_1;t_1;-A_2,t_2;A,t]$ for maximum amplitude switching study, and then by reducing the results to the input-parity case. By (6.5), $$[x_1,y_1]=A_1[1-\tfrac{1}{2}((1+r)e^{-(r-1)\phi_1}+(1-r)e^{-(r+1)\phi_1}), \tfrac{1}{2}q\omega(e^{-(r-1)}\phi^{1-e^{-(r+1)}\phi^1})] \quad (6.8)$$

immediately. It follows that $$x_1 + A_2 = A_1\left\{1 - \frac{1}{2}[(1+r)e^{-(r-1)\phi_1} + (1-r)e^{-(r+1)\phi_1}]\right\} + A_2,$$

$$\frac{y_1}{q\omega} = \frac{1}{2}A_1(r-1)[(r+1)e^{-(r-1)\phi_1} - (r+1)e^{-(r+1)\phi_1}],$$

$$= \frac{1}{2}A_1(r+1)[(r-1)e^{-(r-1)\phi_1} - (r-1)e^{-(r+1)\phi_1}]$$

Thus, with algebra, $$(1 \pm r)(x_1 + A_2) \pm \frac{y_1}{q\omega} = (1 \pm r)A_1\left[\left(1 + \frac{A_2}{A_1}\right) - e^{-(r\mp 1)\phi_1}\right] \quad (6.9)$$

the following are readily obtained $$x_2 = \frac{1}{2}\left[(1+r)(x_1+A_2) + \frac{y_1}{q\omega}\right]e^{-(r-1)\phi_2} + \quad (6.10)$$

$$\frac{1}{2}\left[(1-r)(x_1+A_2) - \frac{y_1}{q\omega}\right]e^{-(r+1)\phi_2} - A_2,$$

$$= \frac{1}{2}A_1\{(1+r)[(1+\rho) - e^{-(r-1)\phi_1}]e^{-(r-1)\phi_2} +$$

$$(1-r)[(1+\rho) - e^{-(r+1)\phi_1}]e^{-(r+1)\phi_2}\} - A_2,$$

and

-continued $$y_2 = -\frac{1}{2}(r-1)[q\omega(r+1)(x_1+A_2)+y_1]e^{-(r-1)\phi_2} + \quad (6.11)$$

$$\frac{1}{2}(r+1)[q\omega(r-1)(x_1+A_2)+y_1]e^{-(r+1)\phi_2}$$

$$= \frac{1}{2}q\omega A_1\{-[(1+\rho) - e^{-(r-1)\phi_1}]e^{-(r-1)\phi_2} +$$

$$[(1+\rho) - e^{-(r+1)\phi_1}]e^{-(r+1)\phi_2}\}.$$

Evidently, having $y_2=0$ is equivalent to having $$[(1+\rho)-e^{-(r-1)\phi_1}]e^{-(r-1)\phi_2}=[(1+\rho)-e^{-(r+1)\phi_1}]e^{-(r+1)\phi_2=\chi<1+\rho}. \quad (6.12)$$

From (6.12), solve for $\phi_2$ as $$\phi_2 = \frac{1}{2}\ln\frac{(1+\rho) - e^{-(r+1)\phi_1}}{(1+\rho) - e^{-(r-1)\phi_1}} > 0. \quad (6.13)$$

Furthermore, (6.12) also reduces $x_2=\tfrac{1}{2}(1+r)A_{1\chi}+\tfrac{1}{2}(1-r)A_1\chi-A_2=A$ to $\chi=\mu+\rho$. By back substitution of (6.13) to (6.12), $$[(1+\rho) - e^{-(r-1)\phi_1}]^{\frac{r+1}{2}} = [(1+\rho) - e^{-(r+1)\phi_1}]^{\frac{r-1}{2}}(\mu+\rho). \quad (6.14)$$

To solve (6.14), it is more convenient to consider $$F(x) = \ln\frac{[(1+\rho) - e^{-(r-1)\phi_1}]^{\frac{r+1}{2}}}{[(1+\rho) - e^{-(r+1)\phi_1}]^{\frac{r-1}{2}}(\mu+\rho)} \quad (6.15)$$

$$= \frac{r+1}{2}\ln[(1+p) - e^{-(r-1)\phi_1}] -$$

$$= \frac{r-1}{2}\ln[(1+\rho) - e^{-(r+1)\phi_1}] - \ln(\mu+\rho).$$

It is then straightforward to obtain $$F'(x) = \frac{r+1}{2}\frac{(r-1)e^{-(r-1)\phi_1}}{[(1+\rho) - e^{-(r-1)\phi_1}]} - \quad (6.16)$$

$$\frac{r-1}{2}\frac{(r+1)e^{-(r+1)\phi_1}}{[(1+\rho) - e^{-(r+1)\phi_1}]}$$

$$= \frac{r^2-1}{2}\frac{(1+\rho)(e^{-(r-1)\phi_1} - e^{-(r+1)\phi_1})}{[(1+\rho) - e^{-(r+1)\phi_1}][(1+\rho) - e^{-(r-1)\phi_1}]} > 0$$

$$\forall\, x > 0.$$

That is, $F(\cdot)$ is strictly increasing. Hence, a solution $\phi_1>0$ exists if and only if $F(0)F(\infty)<0$ viz.

$$\ln\frac{\rho}{\mu+\rho}\ln\frac{1+\rho}{\mu+\rho} < 0 \quad (6.17)$$

which is trivially the case if and only if $$0<\mu<1 \text{ and } 0<\rho\leq 1. \quad (6.18)$$

With the input-parity switching process 250, $A=A_1=A_2$, $\rho=1$, $\mu=1$, $\chi=2$ trivially and (6.13)–(6.14) reduce to $$\phi_2 = \frac{1}{2}\ln\frac{2-e^{-(r+1)\phi_1}}{2-e^{-(r-1)\phi_1}} \quad (6.19)$$

and $$[2-e^{-(r-1)\phi_1}]^{\frac{r+1}{2}} = 2 \cdot [2-e^{-(r+1)\phi_1}]^{\frac{r-1}{2}}. \quad (6.20)$$

In spite of their simple appearances, the fact that $F(\infty)=0$ indicates that $\phi_1=\infty$ is the only solution, which is useless. As such, there exists no input-parity switching process solution for (6.1).

In comparison, the maximum-amplitude switching process 350 entails $\rho=1$ only. Thus, (6.19) still applies, whereas (6.14) becomes $$[2-e^{-(r-1)\phi_1}]^{\frac{r+1}{2}} = (1+\mu^*) \cdot [2-e^{-(r+1)\phi_1}]^{\frac{r-1}{2}}. \quad (6.21)$$

In the previous notation (6.15), $$F(0)F(\infty) = -\ln(1+\mu^*)\ln\frac{2}{1+\mu^*} < 0.$$

Figure 7:
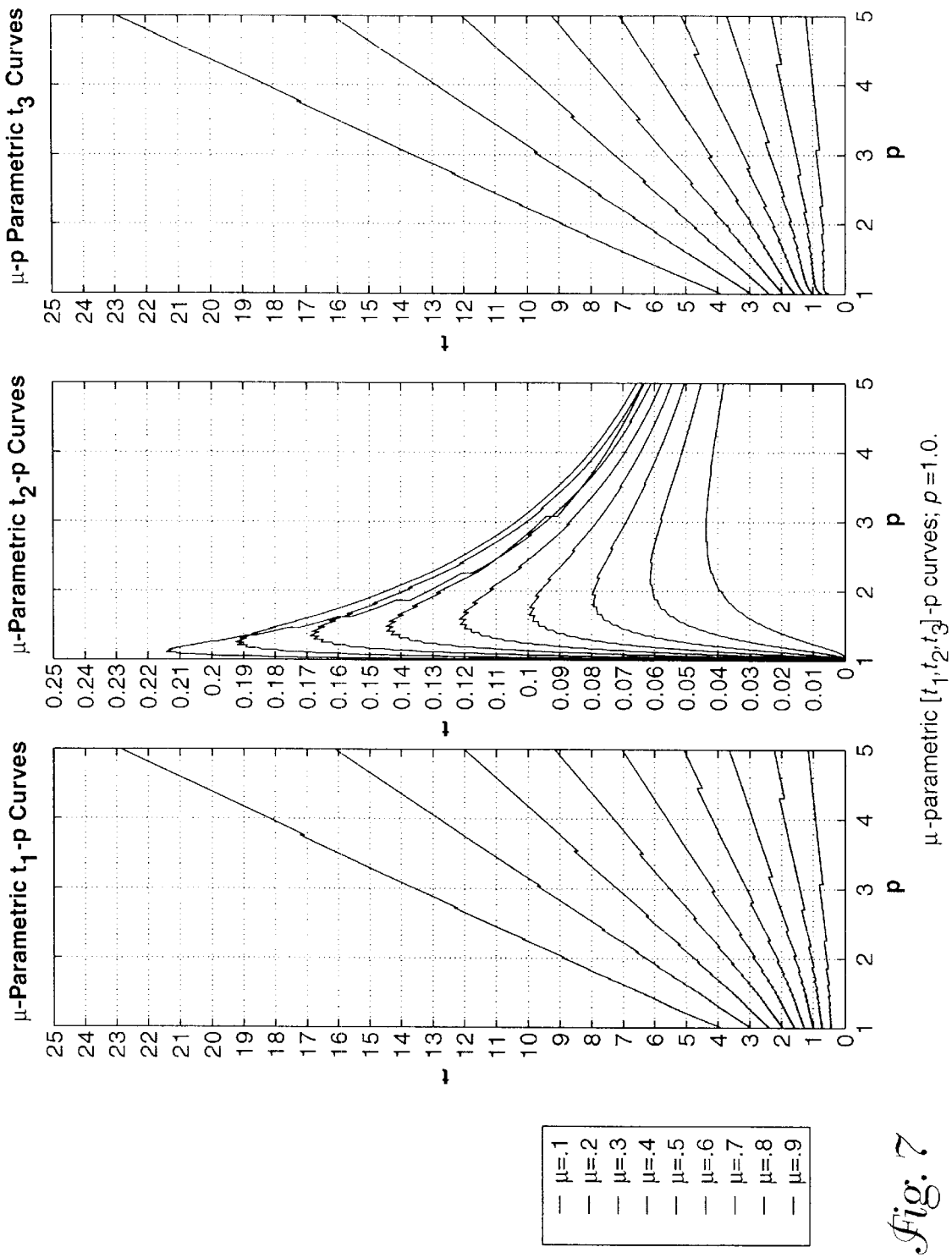
FIG. 7 is a plot of various switching time solution curves for various embodiments of the present invention.

A finite $\phi_1>0$ exists. The solution curves of $[t_1, t_2, t_3]$ as parametric functions of $\rho=1$, $\mu$ and p are shown in FIG. 7.

While it might appear acceptable to have approximity instead of strict equality in (6.20) for input-parity consideration (now that $+\infty$ is the only exact solution), it turns out that input parity switching offers little in this case, since the trajectories of the natural and the switched servos are almost identical.

Consider now the degenerate case that p=1, a critically damped system, resulting in r=−ω a double root. Formulating $x=e^{-\phi}(c_1+c_2 t)+A$ so that $y=e^{-\phi}[-\omega c_1+c_2(1-\phi)]$, and solving for $c_1$ and $c_2$:

$$x = e^{-\phi}\{(x_0-A)+[y_0+\omega(x_0-A)]t\}+A, \quad (6.22)$$

$$y = e^{-\phi}\{-\omega(x_0-A)+[y_0+\omega(x_0-A)](1-\phi)\}, \quad (6.23)$$

which reduce to $$[x,y]=[A[1-e^{-\phi}(1+\phi)], A\omega\phi e^{-\phi}] \quad (6.24)$$

for $x_0=0$ and $y_0=0$. Again, the shrunk fit switching process 150 has no solution.

For the input parity switching process 250, observe that $$x_1 = A_1[1-e^{-\phi_1}(1+\phi_1)] \Longrightarrow x_1 + A_2 \quad (6.25)$$
$$= A_1[(1+\rho)-e^{-\phi_1}(1+\phi_1)],$$

$$y_1 = A_1\omega\phi_1 e^{-\phi_1} \Longrightarrow y_1 + \omega(x_1+A_2) \quad (6.26)$$
$$= A_1\omega[(1+\rho)-e^{-\phi_1}],$$

and $$x_2 = e^{-\phi_2}\{(x_1+A_2)+[y_1+\omega(x_1+A_2)]t_2\} - A_2 \quad (6.27)$$
$$= A_1[(1+\rho-e^{-\phi_1})(1+\phi_2)-\phi_1 e^{-\phi_1}]e^{-\phi_2} - A_2,$$

$$y_2 = e^{-\phi_2}\{-\omega(x_1+A_2)+[y_1+\omega(x_1+A_2)](1-\phi_2)\} \quad (6.28)$$
$$= A_1\omega[e^{-\phi_1}(\phi_1+\phi_2)-(1+\rho)\phi_2].$$

By setting $y_2=0$, $$\phi_2 = \frac{y_1}{y_1+\omega(x_1+A)} = \ldots = \frac{\phi_1 e^{-\phi_1}}{(1+\rho)-e^{-\phi_1}}, \quad (6.29)$$

and by setting $x_2=A$ and simplifying, $$1+\rho-e^{-\phi_1} = \quad (6.30)$$
$$(\mu+\rho)e^{(1+\rho)-e^{-\phi_1}} \Longleftrightarrow F(\phi_1) := \ln\frac{1+\rho-e^{-\phi_1}}{\frac{\phi_1 e^{-\phi_1}}{(\mu+\rho)e^{(1+\rho)-e^{-\phi_1}}}} = 0$$

is obtained.

By the facts that $F(0)=\ln[\rho/(\mu+\rho)]<0$, $F(\infty)=\ln[(1+\rho)/(\mu+\rho)]>0$ if $0<\mu<1$ and $$F'(x) = \ln\frac{(1+\rho)xe^{-x}}{([(1+\rho)-e^{-x}])^2} > 0 \quad \forall x > 0, \quad (6.31)$$

a solution $\phi_1>0$ exists, as well.

For $p<-p1$, (6.12) applies still, with $-(r-1)>-(r+1)>0$. It follows that $1+\rho-e^{-(r-1)\phi_1}$ and $1+\rho-e^{-(r+1)\phi_1}$ must necessarily have the same sign. As either possibility fails (6.13), for $p<-1$, this switching process does not apply. This holds for any $\rho$, including that for maximum-amplitude switching $\rho=1$.

For $p=-1$, it suffices to reverse signs of certain terms in (6.21)–(6.27), yielding $$0 < \phi_2 = \frac{\phi_1 e^{\phi_1}}{1+\rho-e^{\phi_1}} \cdot \Longrightarrow 1+\rho-e^{\phi_1} > 0. \quad (6.32)$$

The equation for $\phi_1$ then becomes $$1+\rho-e^{\phi_1} = (\mu+\rho)e^{\frac{\phi_1 e^{\phi_1}}{1+\rho-e^{\phi_1}}} > \mu+\rho \Longrightarrow 1 > \mu+e^{\phi_1}, \quad (6.33)$$

which is impossible since $\phi_1>0$.

Figure 8:
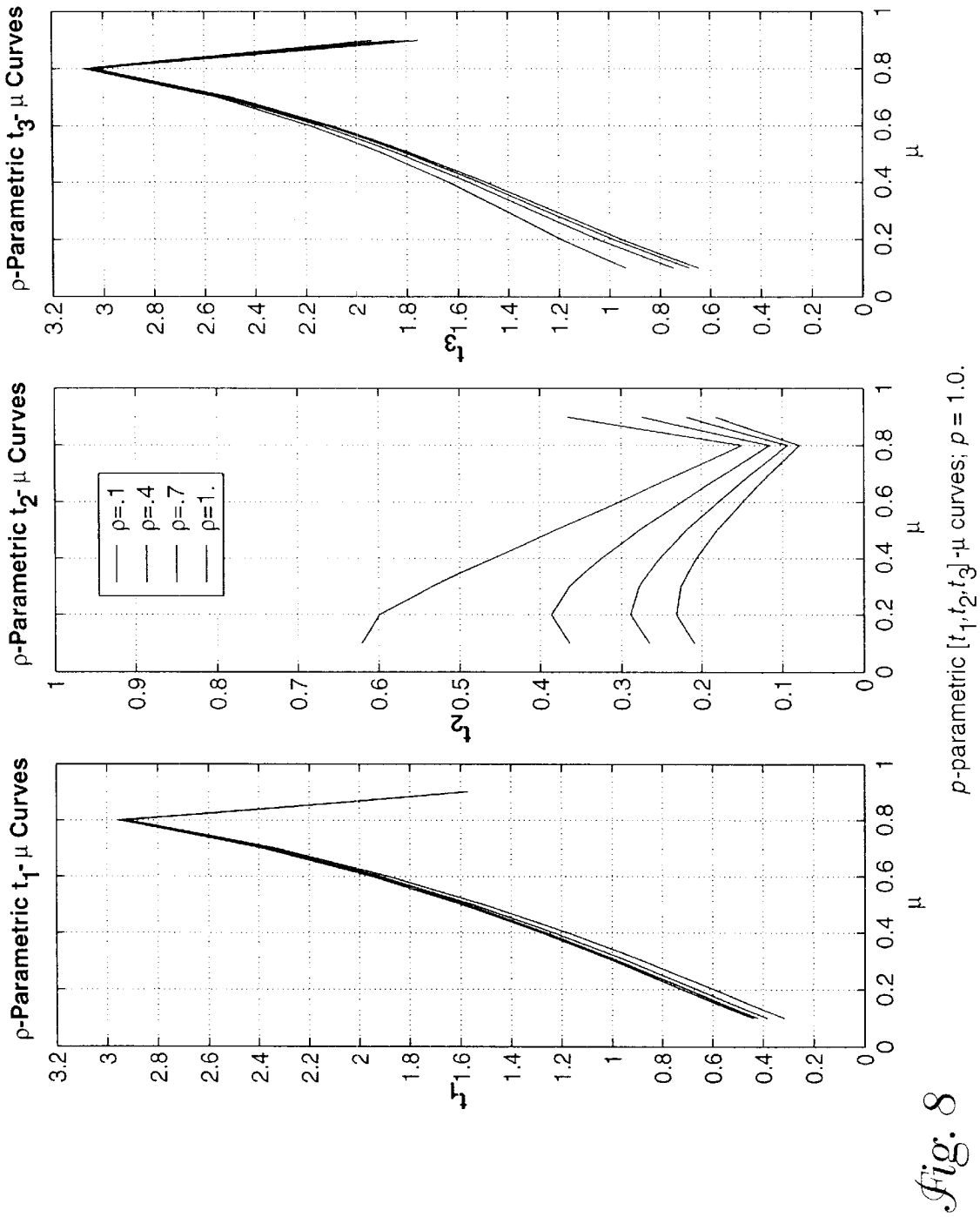
FIG. 8 is a graph of parametric switching time solution curves for various embodiment of the present invention.

As is evidenced by reading out from FIG. 8, there exists a minimax for $\mu=0.8$ (by taking $\mu$ as a parameter); it has appeared that this might be true for all $\rho$. Recall from FIG. 3B that this 'minimax' also exists for $0<p<1$. This was not exhibited in FIG. 6.1 (p>1), however.

Derivation of the curve-fit results parallel to (4.23) for $p \geq 1$ and the results for the cases with nonzero initial velocity parallel to §5 are within the scope of one of skill in the art, and are within the scope of the present invention.

Some Operational Considerations

Servos are often used in continuous mode, that is, the servos receive commands one after the other in a continuous fashion. Further, some servos have command structures with quantized levels for the command, that is, there are specific quantized levels at which the commands are available, instead of along a continuous spectrum of levels. The various embodiments of the present invention as described above are applicable to such servos and to such command level structures.

In this section, considerations are given to two issues that arise naturally in putting the results to practical use. One addresses using the servos in continuous operation, i.e., the servos receiving commands one after another. The other, implicitly related to the first, is concerned with having not analog but quantized levels of command available to the servos.

As indicated in equations (3.16)–(3.18), solutions of the right switching phases (times) can be given by preparing off-line formulae derived via curve-fitting and by retrieving their values in on-line operation mode. A small block of memory is needed to store the coefficients pertinent to the retrieval. It is, however, feasible as well that the right switching phases be solved on-the-fly as the solutions converge rather quickly even in the maximum amplitude switching process 350 for which the timing needs to be re-computed upon arrival of new command.

Continuous Operation

The above switching schemes work well if the servomechanism is given with one command level A. In addition, some degree of robustness of the system given variations in mass, viscosity, stiffness, initial position and velocity, and the like is also present. In a situation in which a servo expects more than one commanded input constant, the following applies:

Consider the following servo input:

$$A = A(t) = \begin{cases} A_1, & 0 < t \le t^1, \\ A_2, & t^1 < t \le t^2, \\ \vdots & \vdots \end{cases} \quad (7.1)$$

Furthermore, assume that as t=0, x(0)=0 has been ensured (by initial pre-operation calibration). Then, as long as $$t_3 < t^1 < t^2 - t^1 < t^3 - t^2 < \quad (7.2)$$

and as long as the new command input is 'reset' by having $$A^1 = A_1, A^2 = A_2 - A_1, A^3 = A_3 - A_2, \ldots, \quad (7.3)$$

the switching scheme operates as expected.

If the new command arrives too early and is in the reverse direction of the last leg (resumption) of switching, there will be a nontrivial delay before the new command is well served. To reduce this delay, in one embodiment the timing for the switching is reset (instead of letting it run thru its course) whenever a new command arrives, regardless whether the previous command has been fulfilled. Consider the scenario that $\tau^{k+1} < t_1$, $$\tau^k := t^{k+1} - t^k.$$

In this situation, a new command arrives while (3.1) is at its normal phase even before reaching the first switching. Thus, $[x(\tau^k), y(\tau^k)]$, and upon reset $[0, y(\tau^k)]$ is the initial condition associated with (3.1) in applying the various embodiments of the switching schemes to serve the command $A^{k+1} - A^k$. Assuming that a measurement $x(\tau^k)$ is not available, $x(\tau^k)$ will be somewhere between 0 and $A^k - A^{k-1}$, its previous goal. This scenario has, in fact, motivated the need to look for an algorithm with which the settling time could be further shortened so as to accommodate frequent changes of command levels.

As mentioned earlier, by applying the convolution theorem the results may apply to serve with a more sophisticated command set; therefore, the discussion focused on piecewise constant commands is not a restriction but rather a simplification. Indeed, if the actuator has a much faster natural frequency than the servo command set has, piecewise constant commands serve well as an approximation.

Quantized Levels of Command

Let $\hat{A} := \{A^1, A^2, \ldots, A^N\}$ be the quantized levels of command a servomechanism is able to generate (besides zero), $0 < A^i$ in ascending order, and let $A^N > A \notin \hat{A}$ be the input level commanded. Consider the following question:

It is possible to schedule the input command levels such that x(t) is settled nearest to A. For example, when only discretized responses can be generated by the actuator employed, e.g., step motors, on-off valves, etc., a solution is given below.

For simplicity, consider first that $A_1 = A^2 - A^1 = A^3 - A^2 = \ldots = A^N - A^{N-1}$, i.e., uniformly spaced. Let $$A^k := \min_k \{|A - A^1|, \ldots, |A - A^N|\}, \quad (7.4)$$

i.e., A rounded off to its nearest quantum $A^k$. Apply the maximum amplitude switching process 350 first with $A^k$, viz. $+A^N$ for $t_1(A^k, A^N)$, then $-A^N$ for $t_2(A^k, A^N)$. Now, at $t_3 = t_1 + t_2$, if $A^k$ is applied, $x(t) = A^k$ for $t \ge t_3$, and thus there is a steady-state error $$|A - A^k| \le \frac{1}{2} A^1 \quad (7.5)$$

which is a minimum possible but unavoidable. Note that $A^{k-1}$ or $A^{k+1}$ may substitute for $A^k$ if there is any additional constraint on the steady-state error. Note also that only one maximum amplitude switching is needed and the settling time incurred would be this $t_3$ only.

Consider next the case that the input levels are not uniformly spaced. Now, apply maximum amplitude switching with $A^{f_1}$ for any $A^{f_1} < A$ first. Apply next with $$A^{t_i} < A - A^{t_{i-1}}, i=2, \ldots, m \quad (7.6)$$

until the steady-state error is acceptably small. By (4.31), it is not difficult to see that the total amount of settling time is given by $$t_3 = \frac{1}{\omega}\left(\phi_3^\$ \frac{A^{l_1}}{A_{\max}} + \phi_{30}\right) + \ldots + \left(\phi_3^\$ \frac{A^{l_m}}{A_{\max}} + \phi_{30}\right) \sim \quad (7.7)$$

$$\frac{1}{\omega}\left[(m-1)\phi_3^\$ \frac{A}{A_{\max}} + m\phi_{30}\right].$$

For instance, m=2, which hopefully would be the typical case, $$t_3 \sim \phi_3^\$ \frac{A}{A_{\max}} + 2t_{30}.$$

This embodiment shows that it is possible to alleviate the problem of inadequate performance in resolution due to having large quantized error by switching.

Simulation Results

Figure 9:
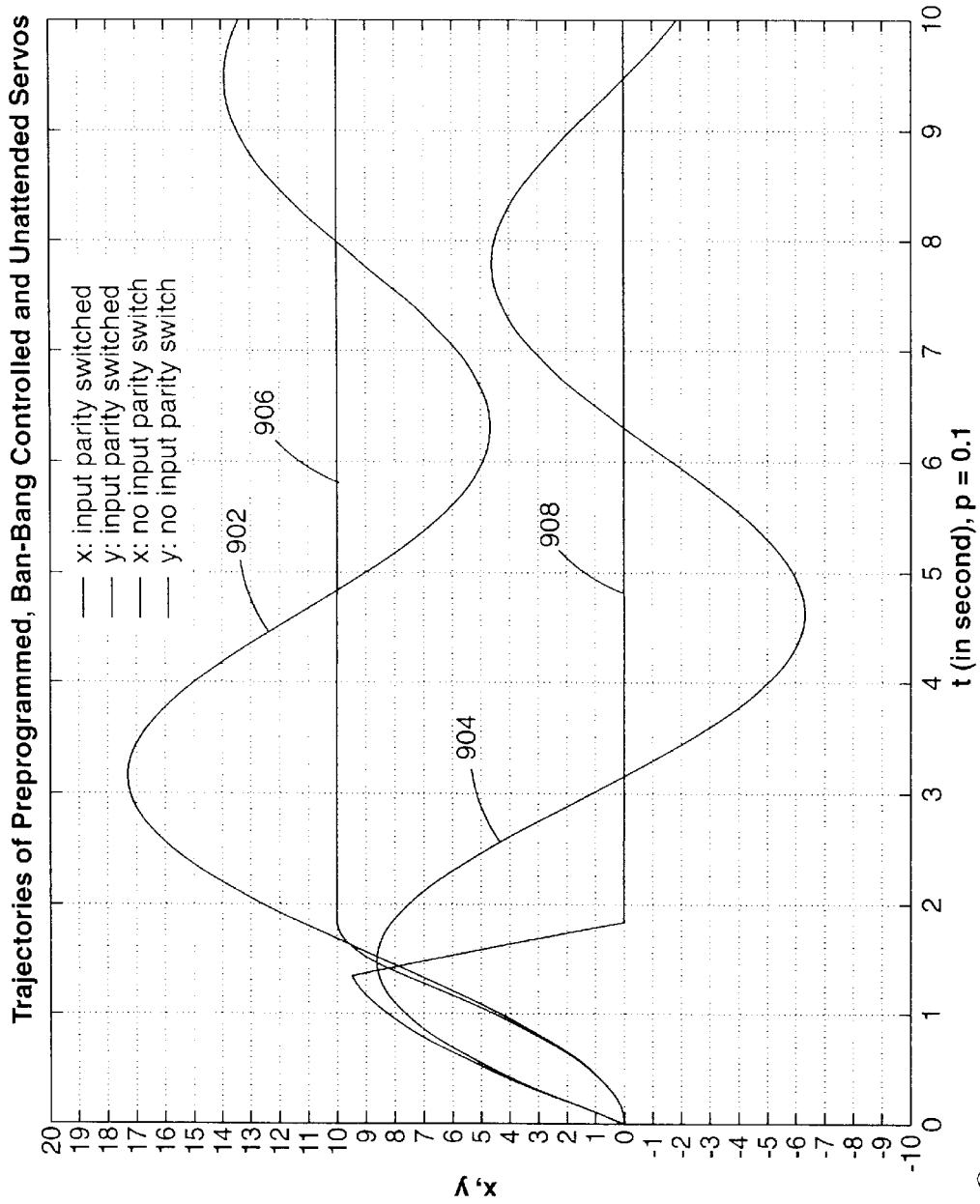
FIG. 9 is a graph of performance comparisons for various embodiments of the present invention.

Various simulation results for the embodiments presented above are shown in graph form in FIGS. 9 to 17. The figures have been discussed or mentioned briefly above in terms of actual processes such as shrunk fit process 150, input parity process 250, and maximum amplitude process 350. FIG. 9 shows performance comparison of a natural, that is unswitched, servo versus a servo switched using input parity switching process 200. Lines 902 and 904 represent unswitched position and unswitched velocity, respectively. In this embodiment, the command level is 10. Lines 906 and 908 represent switched position and switched velocity, respectively.

FIG. 10 shows position comparisons for unswitched servo (line 1002), servo switched with shrunk fit switching process 100 (line 1004), servo switched with input parity switching process 200 (line 1006), and servo switched with maximum amplitude switching process 300 (line 1008).

Figure 11:
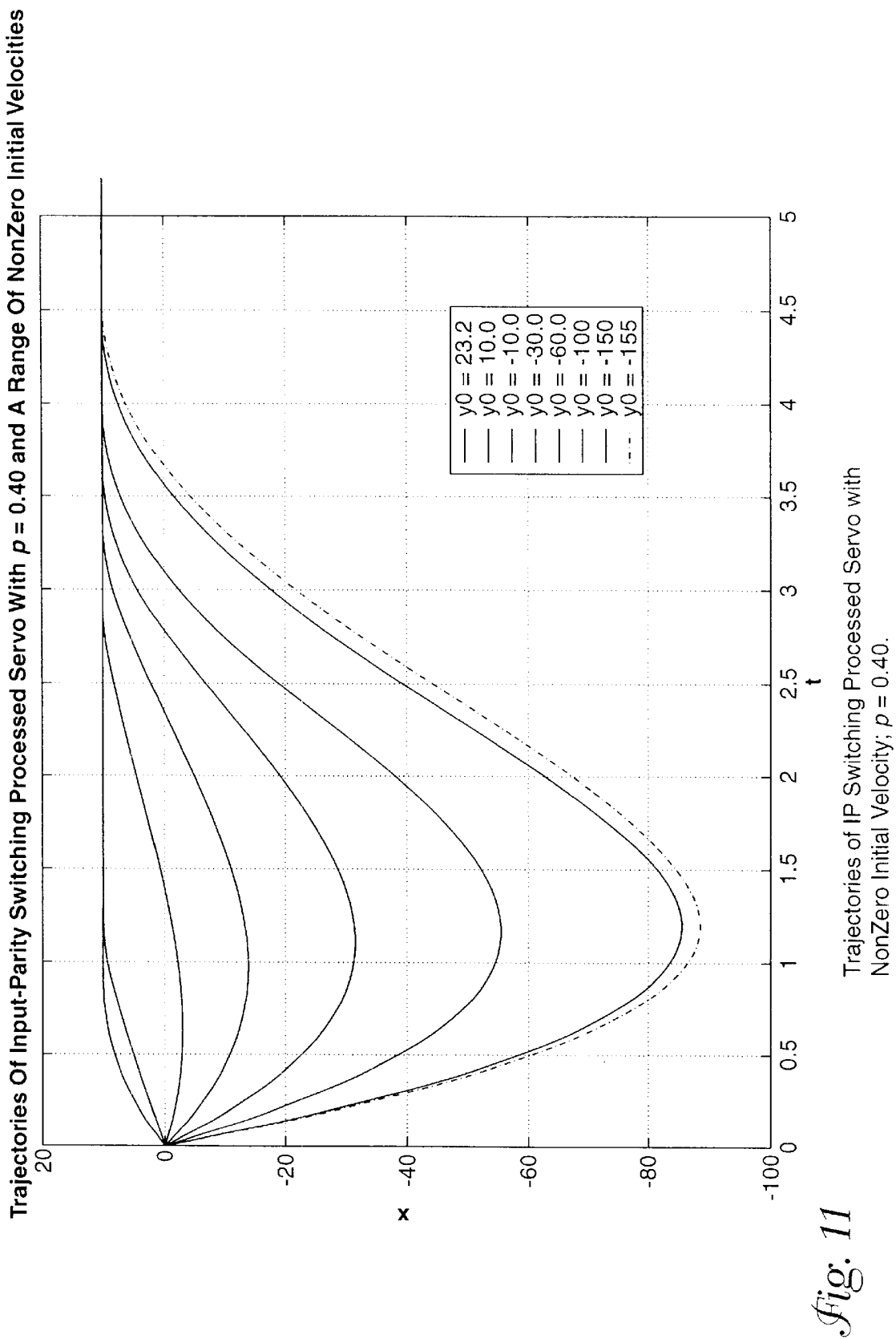
FIG. 11 is a graph of position trajectory curves for an input parity switched process with a range of initial nonzero velocities.

FIG. 11 shows position trajectory curves for an input parity switched process 200 with a range of initial nonzero velocities.

Figure 12:
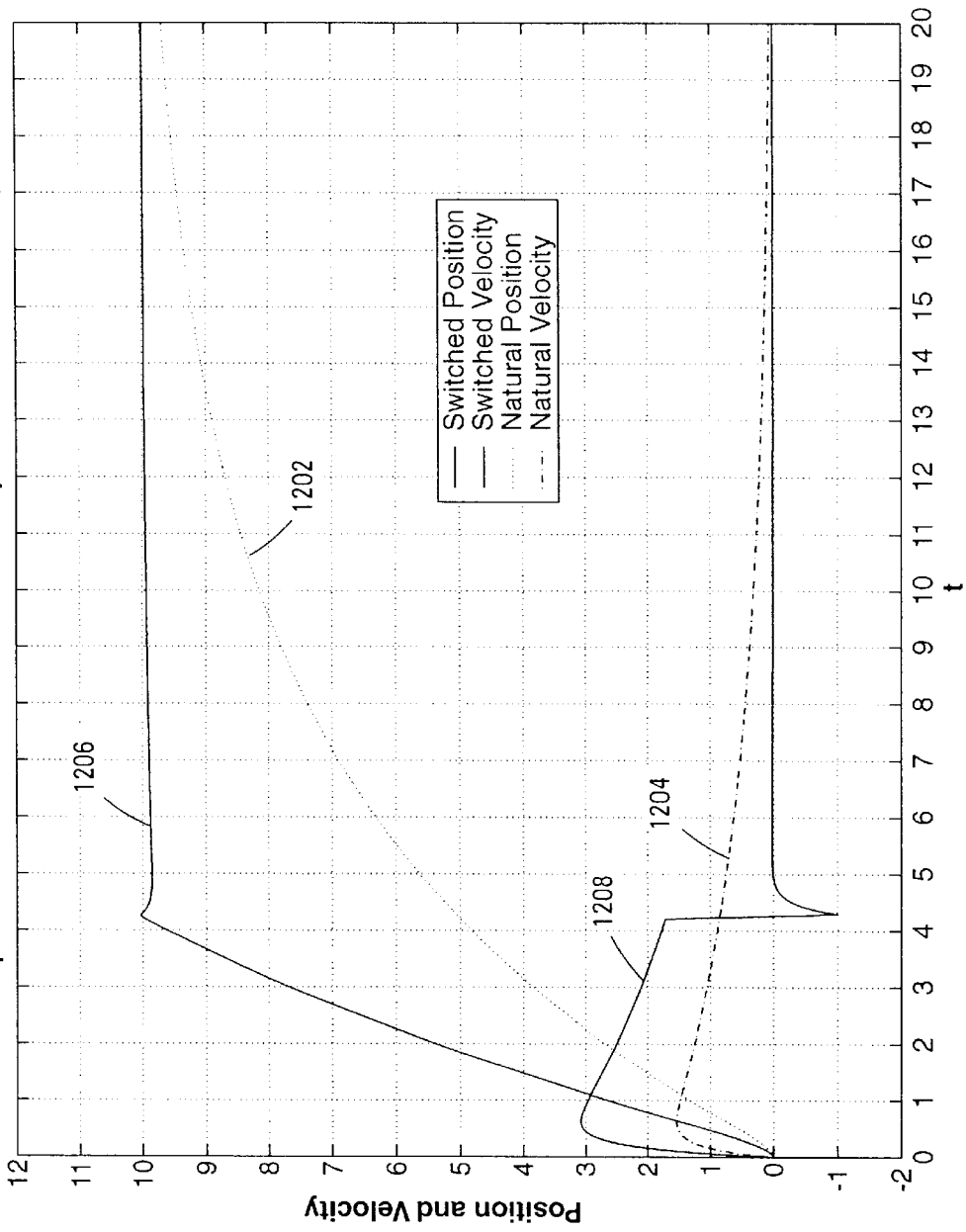
FIG. 12 is a graph of position and velocity trajectory plots for various embodiments of the present invention for an overdamped servo.

FIG. 12 shows position and velocity trajectory plots for an unswitched servo (lines 1202 and 1204 respectively) and for a maximum amplitude switching process 300 (lines 1206 and 1208 respectively), when the servo is overdamped.

Figure 13:
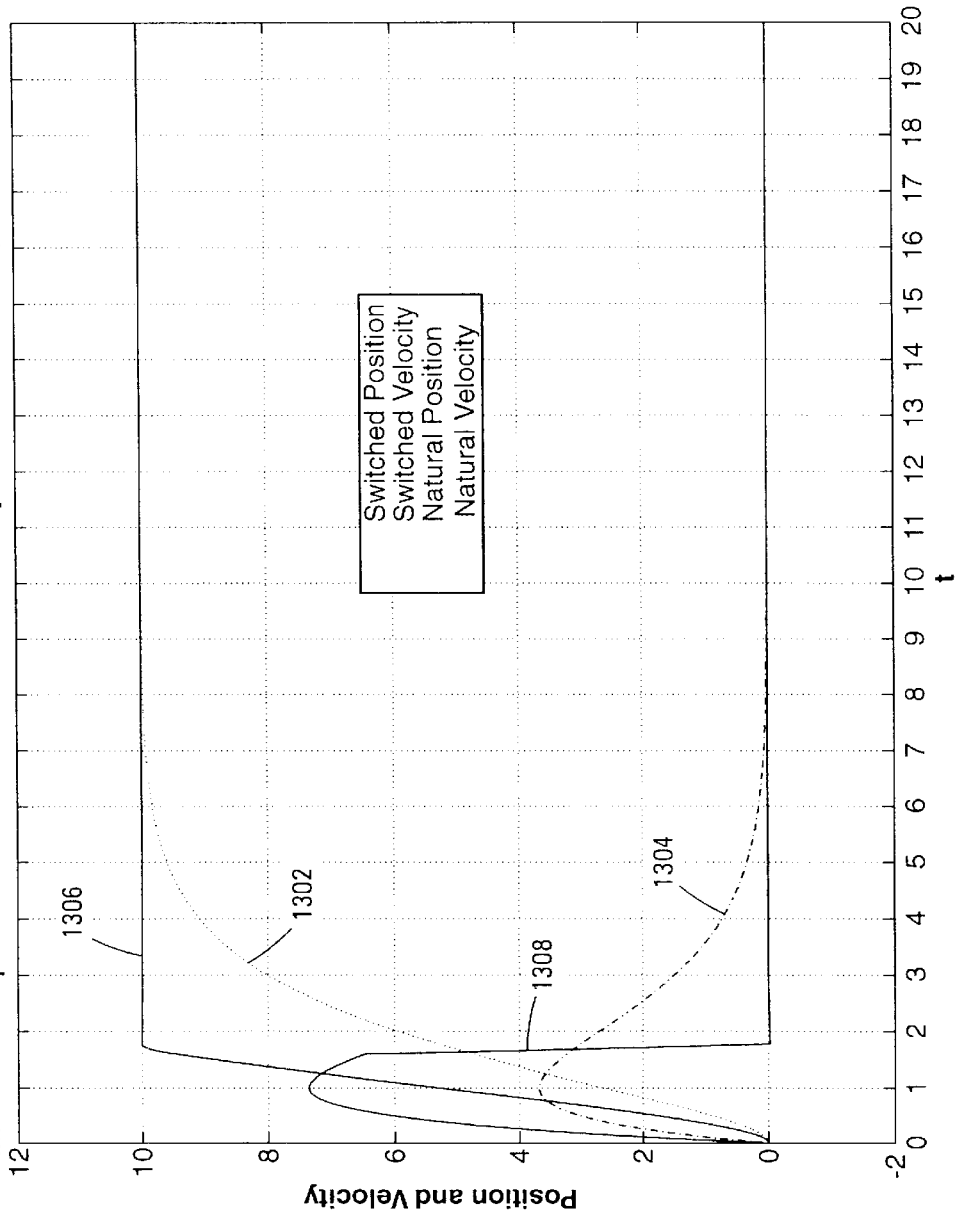
FIG. 13 is a graph of position and velocity trajectory plots for various embodiments of the present invention for a critically damped servo.

FIG. 13 shows position and velocity trajectory plots for an unswitched servo (lines 1302 and 1304 respectively) and for a maximum amplitude switching process 300 (lines 1306 and 1308 respectively), when the servo is critically damped.

Figure 14:
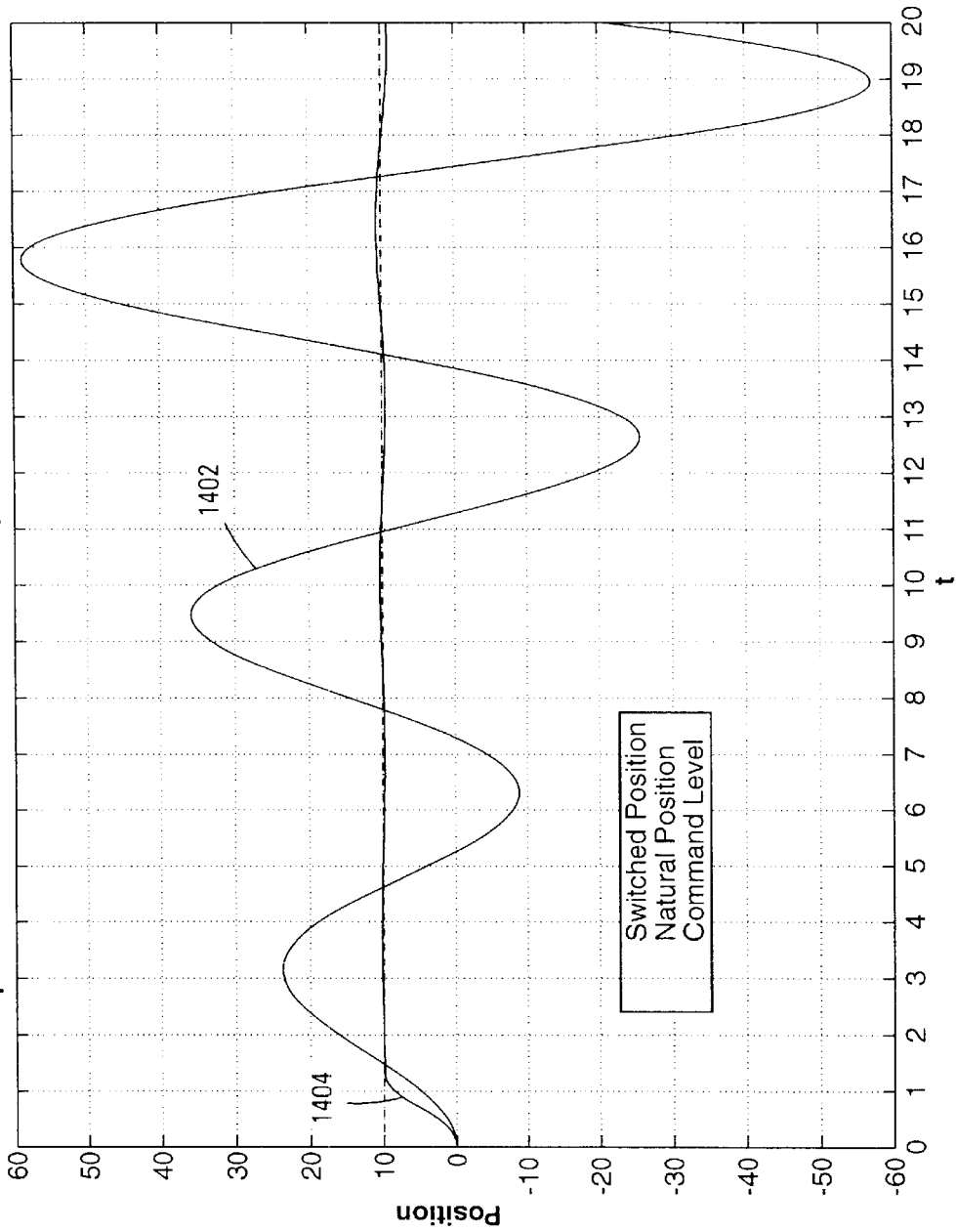
FIG. 14 is a graph of position trajectory plots for an unstable servo for various embodiments of the present invention.

FIG. 14 shows an unswitched position trajectory plot for an unstable system (line 1402) versus a maximum amplitude switching process 300 position trajectory plot for the unstable system (line 1404) for a command level of 10.

Figure 15:
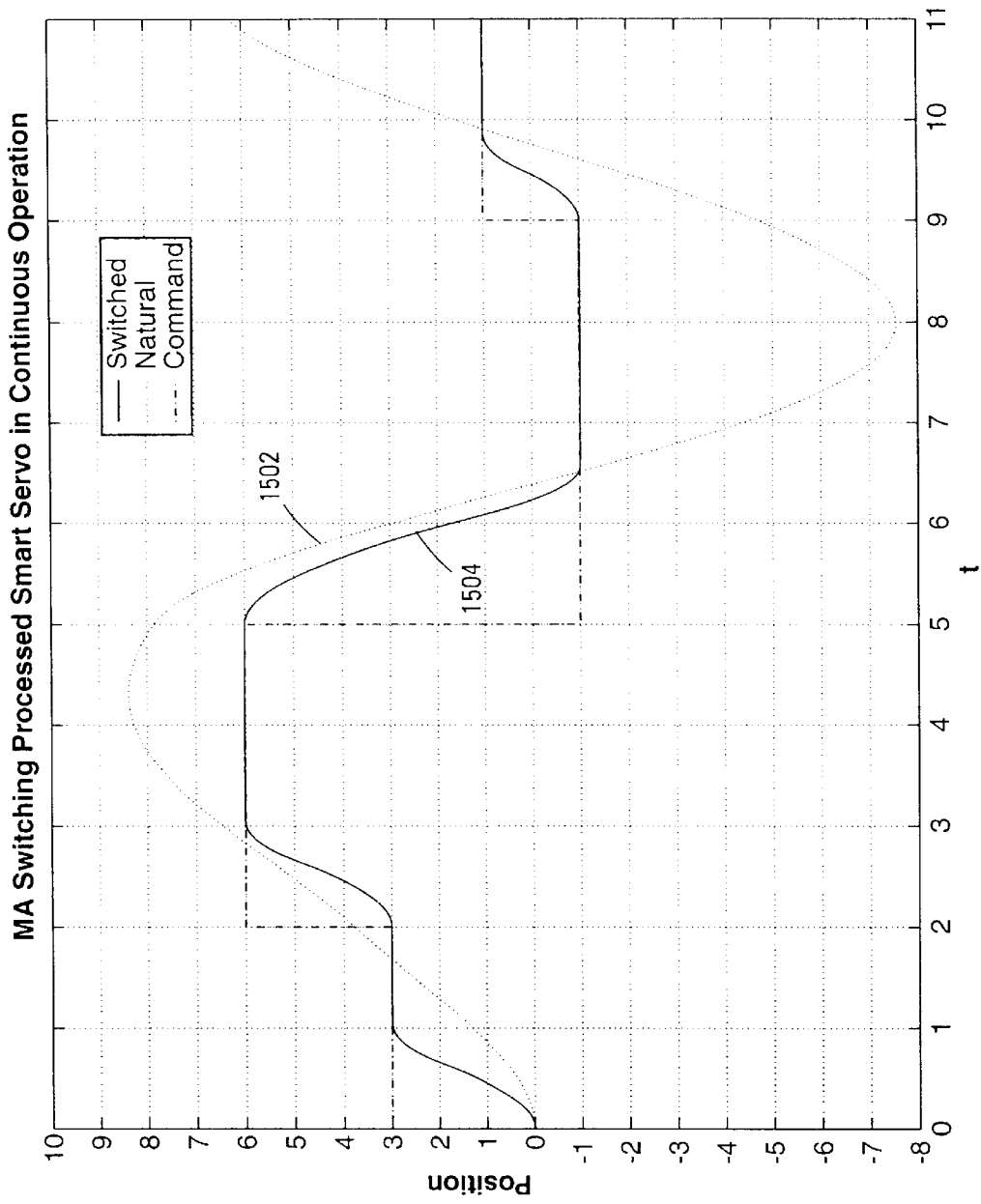
FIG. 15 is a graph of position trajectory plots various embodiments of the present invention.

FIG. 15 shows a graph of a series of command levels 3, 6, −1, and 1, as well as position trajectory plots for an unswitched servo (line 1502) and for a maximum amplitude switching process 300 servo (line 1504).

Figure 16:
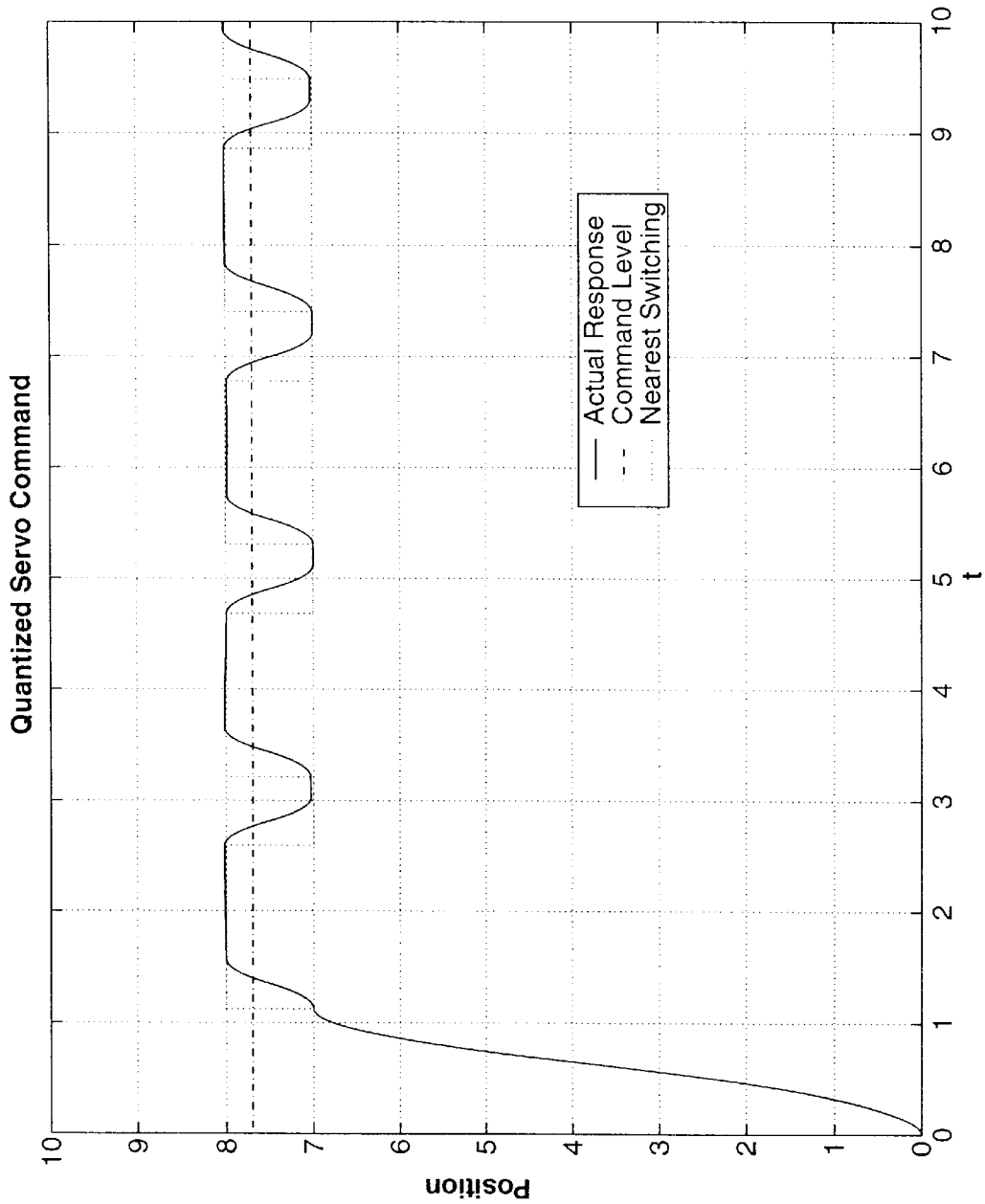
FIG. 16 is a graph of a trajectory plot for a servo using quantized servo commands and a maximum amplitude switching process.

FIG. 16 shows a graph of a trajectory plot for a servo using quantized servo commands and maximum amplitude switching process 300. The desired command level is approximately 7.7. The nearest switching levels for servo commands are 7 and 8. This embodiment uses a defined duty cycle to alternate between allowable levels 7 and 8 such that the position is in proportion to the actual command.

Figure 17:
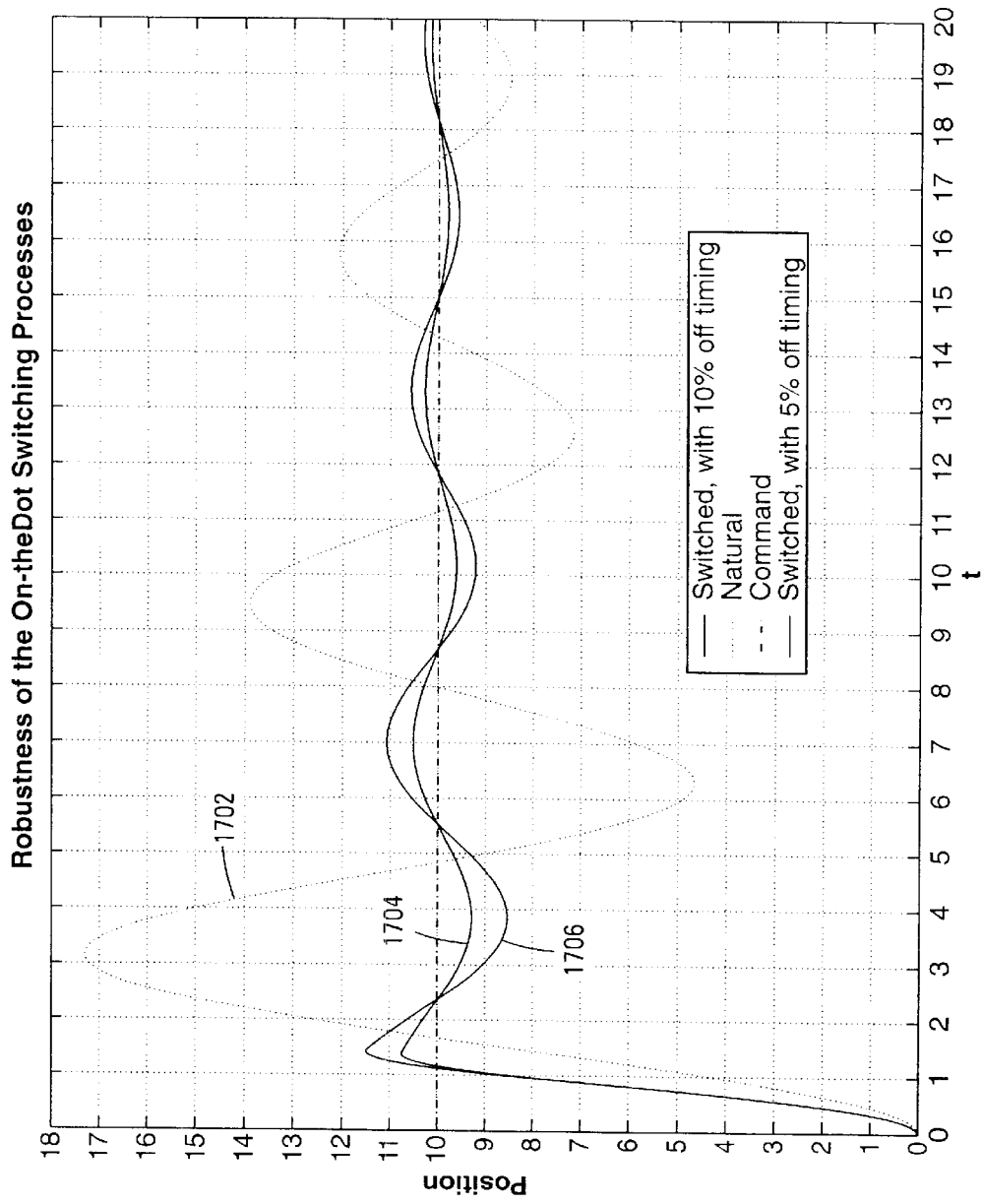
FIG. 17 is a graph of position trajectories for unswitched servos (line 1702), and for switched servos using various embodiments of the present invention with timing errors.

FIG. 17 shows a graph of various position trajectories for unswitched servos (line 1702), and for switched servos using one of the described switching processes 100, 200, or 300 for timing errors of 5% (line 1704) and 10% (line 1706). In other words, the switching times are off by the factors of 5% or 10% due to some error, such as imperfect curve fitting, changing commands, and the like.

CONCLUSION

Analysis and simulation results have been given to three switching processes, namely shrunk fit switching, input parity switching, and maximum amplitude switching. These switching processes, and the apparatuses that embody the processes, achieve quick settling and trivial overshoot for second-order LTI servomechanisms. The switching processes achieve the results without the use of sensors.

The embodiments of the present invention are applicable not only for underdamped servos, but also to certain zero-damped, overdamped, critically-damped, and oscillatorily-unstable servos. In addition to these, the processes are applicable to underdamped servos with a nonzero initial velocity.

Application of the processes to time-continuous operation of servos and to servos that are equipped only by quantized command level is also embodied.

In the embodiments, no sensors are used to determine position of any servo mechanism. Since sensors are not required, numerous advantages accrue. Among the advantages of sensor-free servo settling systems such as those described herein are increased payload availability, reduced weight, reduced size, and the like.

In specific embodiments, methods for controlling a servo of any order include at least re-scheduling of a servo input command signal by applying a switching schedule consisting of a sequence of switching instructions such as amplitude-timelapse pairs, to the servo, and returning to the original servo command at the end of the calculated switching command schedule.

In another embodiment, a switching process-controlled servo control system, as stated above, includes a servomechanism, a processor operatively connected to control the servo, and a timer programmed to apply input command signal amplitudes at pre-determined switching time instants.

In yet another embodiment, a command program for controlling a servo without using sensors includes machine-readable instructions for effecting the method of controlling a servo by applying switching command schedule calculated as stated above.

In still another embodiment, a method of controlling servos of the second order includes formulating the two algebraic conditions that equate the velocity to zero and the position to what originally commanded, at the end of the switching time schedule.

In still another embodiment, an algorithm for programming the instructions includes effecting switching process-controlled servos by curve-fitting the solutions of the algebraic position-velocity equations for efficient execution of the switching program.

Three different implementations of the methods stated above, to meet differing performance-cost specifications, are supplied. The first implementation requires one switching instruction, the amplitude of which is a calculated proportion of the original servo input, and the timelapse of which phases exactly half a cycle from commencement. The second implementation settles faster than the first but requires two switching amplitude-timelapse instructions, the first amplitude of the two being the same as the original servo input, and the second, the negative of the first, and the two timelapses being specified by the unique solutions of the two algebraic position-velocity equations. The third implementation settles the fastest of the three, and requires two switching instructions as well, of which the amplitudes are the maximum and its negative that the servomechanism can provide, and the two timelapses are specified also from the corresponding position-velocity equations.

Application of the various embodiments of the present invention can be made to numerous systems, including by way of example only and not by way of limitation any positional and rotary platforms upon which the servos operate, such as jet reaction control systems, fire control systems, hard disk drive control systems, low-cost guidance systems, numerical precision control systems, elevator debouncing control, tracking radar, auto pilot, hard disk read/write head movement control, scenery changes in virtual reality environment, helmet-mounted displays, and the like.

All the timing for the switching embodiments described herein can be obtained on an off-line basis via curve-fitting, which is helpful for practical servo application.

Embodiments for overdamped systems, critically-damped, and, in fact, systems with unstable complex modes are also presented. Furthermore, some aspects of applying these switching processes in practical, that only discrete/quantized levels of inputs available, are elaborated as well.

Also, making use of the convolution theorem, the processes and apparatuses of the various embodiments of the present invention are extendable to accommodating a larger class of non-constant servo commands.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for controlling a servo, comprising:
   calculating at least a first switching time to change an amplitude of a command signal to a servo;
   providing a first amplitude to the servo for the first switching time; and
   switching the amplitude of the command signal to the servo from the first amplitude to a second amplitude at the first switching time.

2. The method of claim 1, wherein the first amplitude is the command signal amplitude multiplied by a predetermined fraction.

3. The method of claim 2, wherein the predetermined fraction has a value less than one.

4. The method of claim 2, wherein the predetermined fraction is ½.

5. The method of claim 1, and further comprising:
   calculating a second switching time; and
   switching the amplitude of the command signal from the second amplitude to a third amplitude at the second switching time.

6. The method of claim 5, wherein:
   the first amplitude is the command signal amplitude;
   the second amplitude is the negative of the command signal amplitude; and
   the third amplitude is the command signal amplitude.

7. The method of claim 5, wherein the amplitude presented to the servo changes at the first switching time from the command signal amplitude to the negative of the command signal amplitude, and changes at the second switching time from the negative of the command signal amplitude to the command signal amplitude.

8. The method of claim 5, wherein switching the amplitude comprises:
   calculating a maximum amplitude for the servo;
   switching at the first switching time from the maximum amplitude to the negative of the maximum amplitude; and
   switching at the second switching time from the negative of the maximum amplitude to the command signal amplitude.

9. A method for controlling a servo, comprising:
   calculating at least a first switching time to change an amplitude of a command signal to a servo;
   providing a first amplitude to the servo for the first switching time;
   switching the amplitude of the command signal to the servo from the first amplitude to a second amplitude at the first switching time;
   calculating a second switching time; and
   switching the amplitude of the command signal from the second amplitude to a third amplitude at the second switching time;
   wherein the first amplitude is the command signal amplitude.

10. The method of claim 9, wherein the second amplitude is the negative of the command signal amplitude.

11. The method of claim 10, wherein the third amplitude is the command signal amplitude.

12. A method for controlling a servo, comprising:
    calculating at least a first switching time to change an amplitude of a command signal to a servo;
    providing a first amplitude to the servo for the first switching time;
    switching the amplitude of the command signal to the servo from the first amplitude to a second amplitude at the first switching time; and
    wherein calculating comprises solving for unknowns in second order linear servo control equations.

13. A method comprising:
    calculating at least a first switching time to change an amplitude of a command signal to a servo;
    providing a first amplitude to the servo for the first switching time;
    switching the amplitude of the command signal to the servo from the first amplitude to a second amplitude at the first switching time; and
    adjusting the switching times upon receipt of another input command signal.

14. The method of claim 13, wherein adjusting comprises:
    determining position and velocity of the servo from a timer and initial conditions alone; and
    recalculating switching times factoring in the position and velocity of the servo.

15. A method for controlling a servo, comprising:
    calculating a switching time to switch a servo from a first amplitude input to a command input amplitude;
    multiplying the command input amplitude by a predetermined fit factor to obtain the first amplitude input;
    applying the first amplitude input up to the switching time; and
    applying the command input amplitude after the first switching time.

16. A method for controlling a servo, comprising:
    calculating first and second switching times;
    applying a command input amplitude to the servo up to the first switching time;
    applying the negative of the command input amplitude to the servo from the first switching time to the second switching time; and
    applying the command input amplitude to the servo after the second switching time.

17. A method for controlling a servo, comprising:
    calculating first and second switching times;
    calculating a maximum amplitude the servo can accept;
    applying the maximum amplitude to the servo up to the first switching time;
    applying the negative of the maximum amplitude to the servo from the first switching time to the second switching time; and
    applying a command input amplitude to the servo after the second switching time.

18. A servo system, comprising:
    a servo;
    a processor operatively connected to control the servo; and
    a timer programmed to time application of input command signal amplitudes to the servo at pre-determined switching time instants.

19. A servo system, comprising:
a servo;
a processor operatively connected to control the servo; and
a timer programmed to time application of input command signal amplitudes to the servo at pre-determined switching time instants;
wherein the processor applies a first amplitude up to a first switching time, a second amplitude from the first switching time to a second switching time, and a third amplitude from the second switching time forward.

20. The servo system of claim 19, comprising:
wherein the first amplitude is the command signal amplitude, the second amplitude is the negative of the command signal amplitude, and the third amplitude is the command signal amplitude.

21. The servo system of claim 19, wherein the first amplitude is the maximum allowable servo amplitude, the second amplitude is the negative maximum servo amplitude, and the third amplitude is the command signal amplitude.

22. A command program for switching a servo without sensors, comprising machine readable instructions for effecting a method, the method comprising:
calculating at least a first switching time to switch a command amplitude from a first level to a second level; and
switching the amplitude of the command signal to the servo at the switching time.

23. The command program of claim 22, wherein switching the amplitude comprises:
generating a first amplitude by multiplying the command signal amplitude by a predetermined fraction;
applying the first amplitude to the servo up to the first switching time; and
applying the command signal amplitude to the servo after the first switching time.

24. The command program of claim 22, wherein the method further comprises:
calculating a second switching time; and
wherein switching the amplitude comprises:
applying the command signal amplitude to the servo for the first switching time, applying the negative of the command signal amplitude to the servo between the first and the second switching times, and applying the command signal amplitude to the servo after the second switching time.

25. The command program of claim 22, wherein the method further comprises:
calculating a second switching time;
calculating a maximum allowable amplitude for the servo; and
wherein switching the amplitude comprises:
applying the maximum allowable amplitude to the servo for the first switching time, applying the negative of the maximum allowable amplitude to the servo between the first and the second switching times, and applying the command signal amplitude to the servo after the second switching time.

26. A method of switching a servo, comprising:
applying predetermined input values to the servo at selected times; and
settling the servo using only the input values and switching times.

27. The method of claim 26, wherein the first input value is a predetermined fraction of the command signal amplitude, and wherein the second input value is the command signal amplitude.

28. A method of switching a servo, comprising:
applying predetermined input values to the servo at selected times; and
settling the servo using only the input values and switching times;
wherein the predetermined times comprise a first and a second switching time, and the predetermined input values comprise first and second input values, and wherein the first input value is applied up to the first switching time and after the second switching time, and the second input value is applied between the first and the second switching times.

29. The method of claim 28, wherein the first input value is the command signal amplitude, and wherein the second input value is the negative of the command signal amplitude.

30. A method of switching a servo, comprising:
applying predetermined input values to the servo at selected times; and
settling the servo using only the input values and switching times;
wherein the predetermined times comprise a first and a second switching time, and the predetermined input values comprise first, second, and third input values, and wherein the first input value is applied up to the first switching time, the second input value is applied between the first and the second switching times, and the third input value is applied after the second switching time.

31. The method of claim 30, wherein the first input value is the maximum allowable input value for the servo, the second amplitude is the negative of the maximum input amplitude of the servo, and the third amplitude is the command signal amplitude.

32. A method for controlling a servomechanism, comprising:
initiating a servomechanism control command;
modifying the command based on the type of servomechanism;
applying the modified command to the servomechanism.

33. A method for controlling a servomechanism, comprising:
initiating a servomechanism control command;
modifying the command based on the type of servomechanism;
applying the modified command to the servomechanism;
wherein modifying the command comprises determining a first time and a second time based on the solutions of equations of angular velocity and position.

34. The method of claim 33, wherein applying the modified command comprises:
applying a commanded input level from time 0 to the first time;
applying a negative of the commanded input level for the second time; and
applying a commanded input level from then on.

35. A method for controlling a servomechanism, comprising:
initiating a servomechanism control command;
modifying the command based on the type of servomechanism; and
applying the modified command to the servomechanism;
wherein modifying the command comprises:

determining a maximum command level amplitude for the system; and determining a first time and a second time based on the solutions of equations of angular velocity and position.

36. The method of claim 35, wherein applying the modified command comprises:

applying the maximum command level from time 0 to the first time;

applying a negative of the maximum command level for the second time; and applying the commanded input level from then on.

37. The method of claim 35, wherein determining the first and the second times comprises curve-fitting the solutions of velocity and position equation as functions of the system parameters.

38. A method for controlling a servomechanism, comprising:

pre-processing a servo command according to a predetermined processing protocol;

generating a new command set from the servo command; and applying the new command set to the servomechanism;

wherein pre-processing comprises:
 looking up a type of servo from a lookup table;
 looking up a processing protocol for the type of servo, and
 applying the processing protocol for the type of server.

39. A method for operating a control system, comprising:

determining if an explicit solution as a function of the system parameters is available;

receiving a command for the control system;

modifying the command according to a predetermined modification protocol; and applying the modified command to the system.

40. A method of controlling a servo without sensors that achieves zero overshoot and rapid settling in fulfilling a servomechanism control command, comprising:

initiating the servomechanism control command;

modifying the servomechanism control command based on the type of servomechanism;

wherein modifying the servomechanism control command includes determining up to two switching events based on the solutions of equations of angular velocity and position; and applying the modified servomechanism control command to the servomechanism.

41. The method of claim 40, wherein the switching events are pre-programmed.

42. The method of claim 40, wherein one of the up to two switching events comprises a first pulse of length t1 and an amplitude of A1 based on the solutions of the equations.

43. The method of claim 40, wherein a first of the up to two switching events comprises a pulse length of t1 and an amplitude of A1 and a second of the up to two switching events comprises a pulse of length t2 and an amplitude of A2 applied in the opposite direction of the first switching events.

44. The method of claim 43, wherein amplitudes A1 and A2 are of the same magnitude.

45. The method of claim 43, wherein amplitudes A1 and A2 are of the same magnitude of the servomechanism control command and the two pulse lengths t1 and t2 are solved by the equations of angular velocity and position.

46. The method of claim 43, wherein amplitudes A1 and A2 are of the maximum magnitudes the servomechanism can generate and the two pulse lengths t1 and t2 are solved by the equations of angular velocity and position.

47. The method of claim 40, wherein the up to two switching events each include its own switching command schedule specification derived from a set of two algebraic equations imposing on the desired resulting state of the servo.

48. The method of claim 47, wherein the switching command schedule is computed.

49. The method of claim 47, wherein the switching command schedule is stored in memory.

* * * * *